(12) United States Patent

Si et al.

(10) Patent No.: US 12,531,703 B2
(45) Date of Patent: Jan. 20, 2026

(54) METHOD AND APPARATUS FOR TRANSMISSION WINDOW DETERMINATION FOR A PHYSICAL SIDELINK FEEDBACK CHANNEL

(71) Applicant: Samsung Electronics Co., Ltd., Suwon-si (KR)

(72) Inventors: Hongbo Si, Plano, TX (US); Emad N. Farag, Flanders, NJ (US); Carmela Cozzo, San Diego, CA (US); Kyeongin Jeong, Allen, TX (US); Shiyang Leng, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 18/163,204

(22) Filed: Feb. 1, 2023

(65) Prior Publication Data

US 2023/0269056 A1 Aug. 24, 2023

Related U.S. Application Data

(60) Provisional application No. 63/311,782, filed on Feb. 18, 2022.

(51) Int. Cl.
*H04L 5/00* (2006.01)
*H04L 1/1812* (2023.01)
*H04W 16/14* (2009.01)
*H04W 72/40* (2023.01)

(52) U.S. Cl.
CPC .......... *H04L 5/0055* (2013.01); *H04L 1/1812* (2013.01); *H04W 72/40* (2023.01); *H04W 16/14* (2013.01)

(58) Field of Classification Search
CPC ... H04L 5/0055; H04L 1/1812; H04L 5/0053; H04L 1/1861; H04L 1/1864;
(Continued)

(56) References Cited

U.S. PATENT DOCUMENTS

2020/0220669 A1\* 7/2020 Park ...................... H04L 1/1861
2020/0322099 A1\* 10/2020 Park ...................... H04W 72/20
(Continued)

FOREIGN PATENT DOCUMENTS

WO    WO 2021/145745 A1 \*   7/2021

OTHER PUBLICATIONS

International Search Report and Written Opinion issued May 24, 2023 regarding International Application No. PCT/KR2023/002269, 6 pages.
(Continued)

*Primary Examiner* — Rushil P. Sampat

(57) ABSTRACT

Apparatuses and methods for transmission window determination for a physical sidelink feedback channel (PSFCH) in a wireless communication system. A method of user equipment (UE) includes receiving a set of configurations from a higher layer and receiving a physical sidelink shared channel (PSSCH). The PSSCH enables hybrid automatic repeat request (HARQ) feedback. The method further includes determining a transmission window for a PSFCH; performing a sidelink (SL) channel access procedure before a transmission occasion in the one or multiple transmission occasions; and transmitting the HARQ feedback in the transmission occasion for the PSFCH over a channel upon successfully performing the SL channel access procedure. The transmission window includes the one or multiple transmission occasions for the PSFCH and the one or multiple transmission occasions are based on at least one of: a window offset, an interval between two neighboring transmission occasions, and a number of transmission occasions.

14 Claims, 11 Drawing Sheets

(58) Field of Classification Search
CPC ... H04L 1/1896; H04L 5/0078; H04L 5/0094; H04L 2001/0092; H04W 72/40; H04W 16/14; H04W 72/0446; H04W 72/1263; H04W 72/25

See application file for complete search history.

(56) References Cited

U.S. PATENT DOCUMENTS

| | | |
|---|---|---|
| 2020/0351669 A1 | 11/2020 | Xu et al. |
| 2020/0374978 A1 | 11/2020 | Panteleev et al. |
| 2020/0396040 A1 | 12/2020 | Miao |
| 2021/0092783 A1 | 3/2021 | Sun et al. |
| 2021/0099994 A1* | 4/2021 | Park ..................... H04L 1/1861 |
| 2021/0203453 A1 | 7/2021 | Kim et al. |
| 2021/0314821 A1 | 10/2021 | Huang et al. |
| 2023/0055280 A1* | 2/2023 | Hwang ................. H04W 72/20 |
| 2023/0224907 A1* | 7/2023 | Lee ........................ H04W 4/40 370/329 |

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

Extended European Search Report issued Mar. 31, 2025 regarding Application No. 23756647.6, 8 pages.

* cited by examiner

METHOD AND APPARATUS FOR TRANSMISSION WINDOW DETERMINATION FOR A PHYSICAL SIDELINK FEEDBACK CHANNEL

CROSS-REFERENCE TO RELATED APPLICATIONS AND CLAIM OF PRIORITY

The present application claims priority to U.S. Provisional Patent Application No. 63/311,782, filed on Feb. 18, 2022. The contents of the above-identified patent document is incorporated herein by reference.

TECHNICAL FIELD

The present disclosure relates generally to wireless communication systems and, more specifically, the present disclosure relates to transmission window determination and time domain enhancements for a physical sidelink feedback channel (PSFCH) in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to transmission window determination and time domain enhancements for a PSFCH in a wireless communication system.

In one embodiment, a user equipment (UE) in a wireless communication system operating with a shared spectrum channel access is provided. The UE includes a transceiver configured to receive a set of configurations from a higher layer and receive a physical sidelink shared channel (PSSCH). The PSSCH enables hybrid automatic repeat request (HARQ) feedback. The UE further includes a processor operably coupled to the transceiver. The processor is configured to determine, from the set of configurations, a transmission window for a PSFCH and perform a sidelink (SL) channel access procedure before a transmission occasion in one or multiple transmission occasions. The transmission window includes the one or multiple transmission occasions for the PSFCH and the one or multiple transmission occasions are based on at least one of: a window offset, an interval between two neighboring transmission occasions, and a number of transmission occasions in the transmission window. The transceiver is further configured to transmit the HARQ feedback in the transmission occasion for the PSFCH over a channel upon successfully performing the SL channel access procedure.

In another embodiment, a method of UE in a wireless communication system operating with a shared spectrum channel access is provided. The method includes receiving a set of configurations from a higher layer and receiving a PSSCH. The PSSCH enables HARQ feedback. The method further includes determining, from the set of configurations, a transmission window for a PSFCH; performing a SL channel access procedure before a transmission occasion in the one or multiple transmission occasions; and transmitting the HARQ feedback in the transmission occasion for the PSFCH over a channel upon successfully performing the SL channel access procedure. The transmission window includes the one or multiple transmission occasions for the PSFCH and the one or multiple transmission occasions are based on at least one of: a window offset, an interval between two neighboring transmission occasions, and a number of transmission occasions in the transmission window.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.6.0, "NR; Physical channels and modulation"; 3GPP TS 38.212 v16.6.0, "NR; Multiplexing and Channel coding"; 3GPP TS 38.213 v16.6.0, "NR; Physical Layer Procedures for Control"; 3GPP TS 38.214 v16.6.0, "NR; Physical Layer Procedures for Data"; 3GPP TS 38.331 v16.5.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
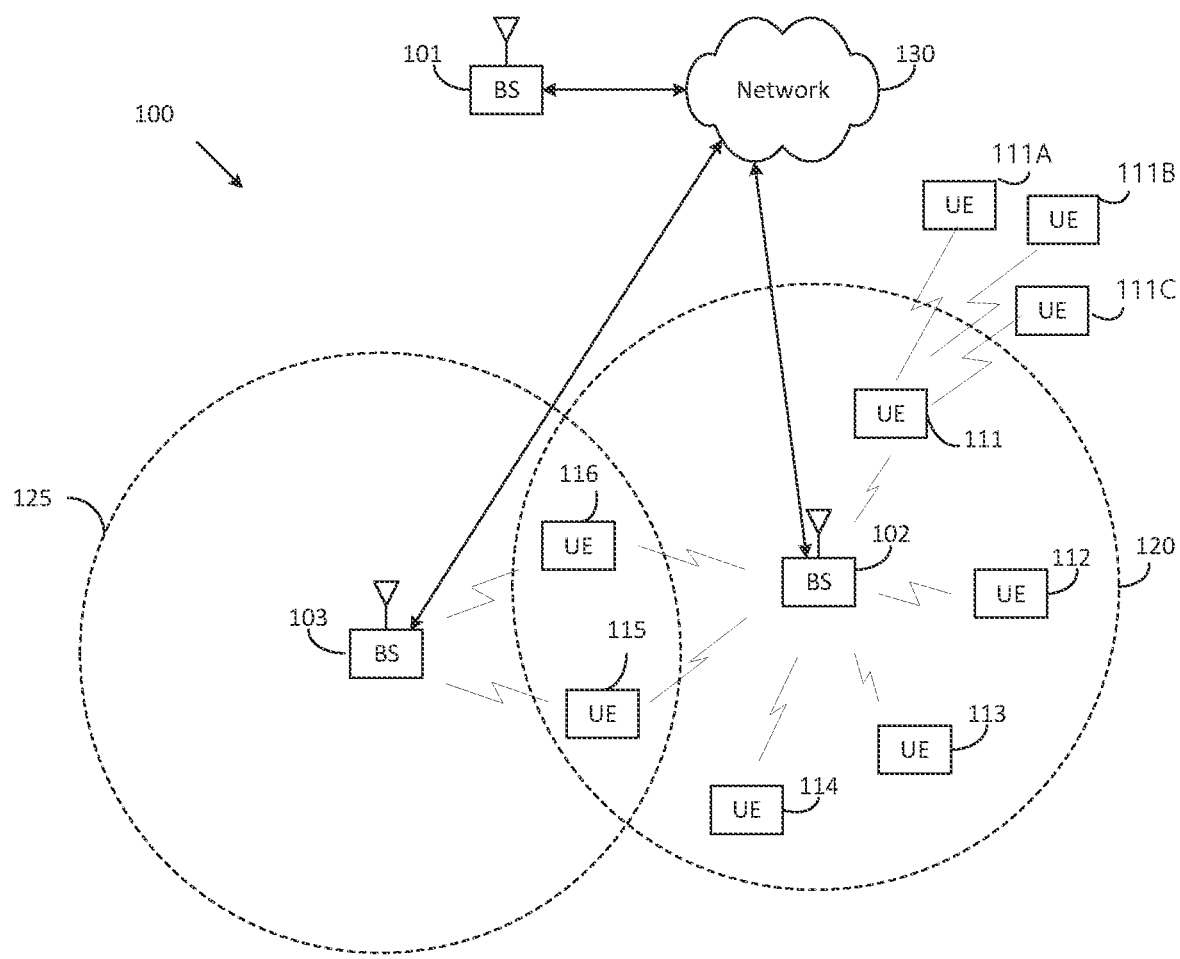
FIG. 1 illustrates an example of wireless network according to embodiments of the present disclosure.
Figure 2:
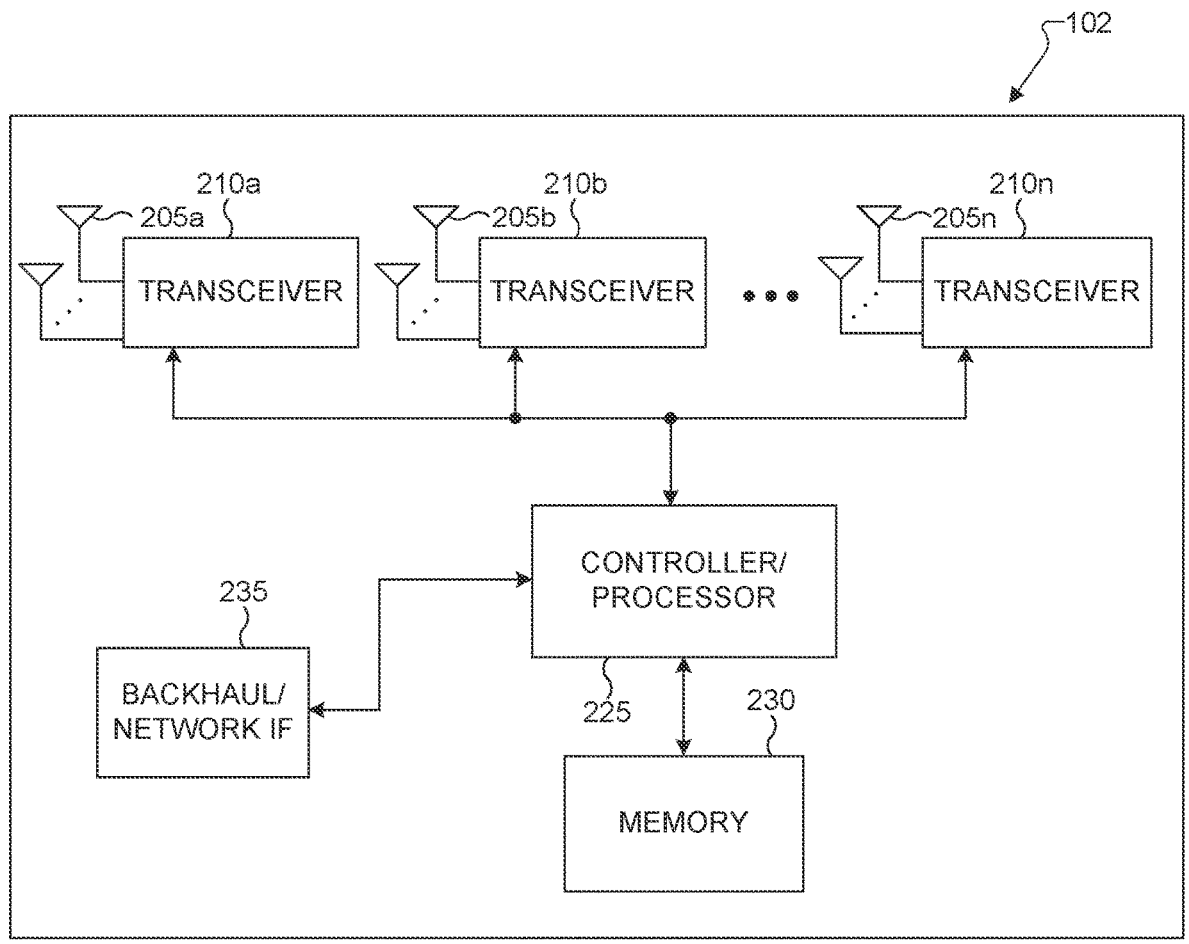
FIG. 2 illustrates an example of gNB according to embodiments of the present disclosure.
Figure 3:
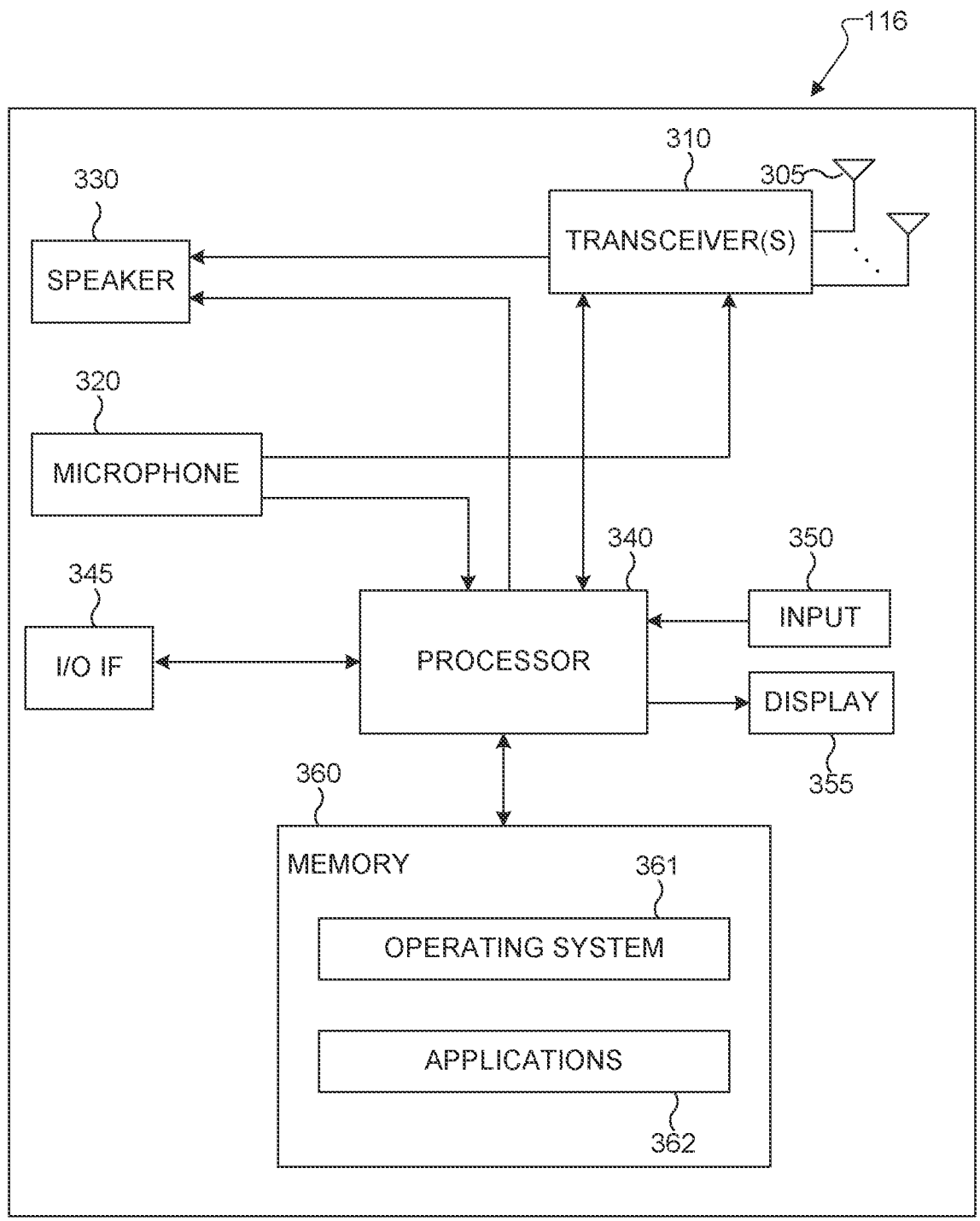
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for transmission window determination and time domain enhancements for a PSFCH in a wireless communication system. In certain embodiments, and one or more of the gNBs 101-103 includes circuitry, programing, or a combination thereof, transmission window determination and time domain enhancements for a PSFCH in a wireless communication system.

Although FIG. 1 illustrates one example of a wireless network, various changes may be made to FIG. 1. For example, the wireless network could include any number of gNBs and any number of UEs in any suitable arrangement.

Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for transmission window determination and time domain enhancements for a PSFCH in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or SL channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for transmission window determination and time domain enhancements for a PSFCH in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
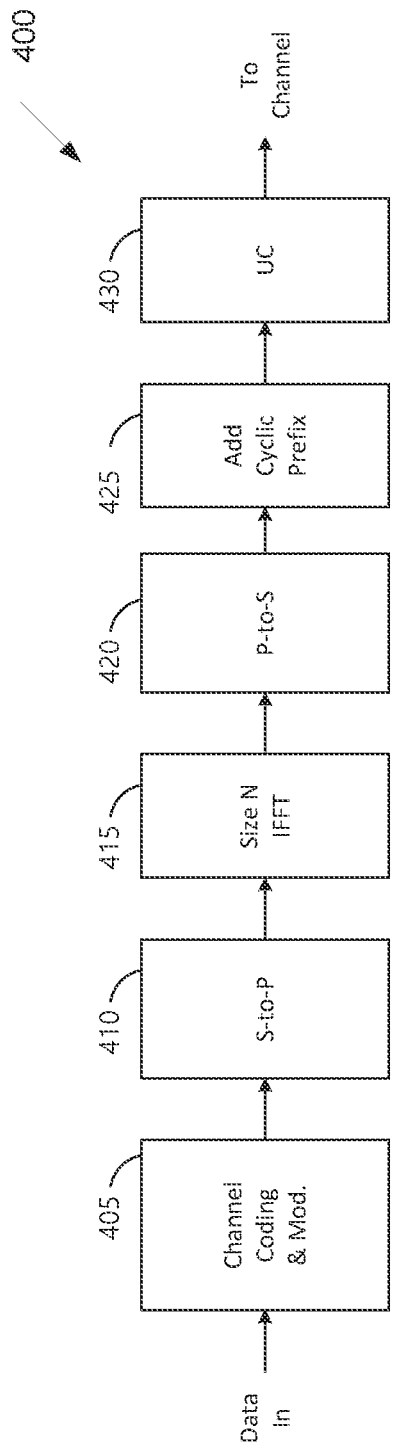
FIGS. 4 and 5 illustrate example of wireless transmit and receive paths according to the present disclosure.
Figure 5:
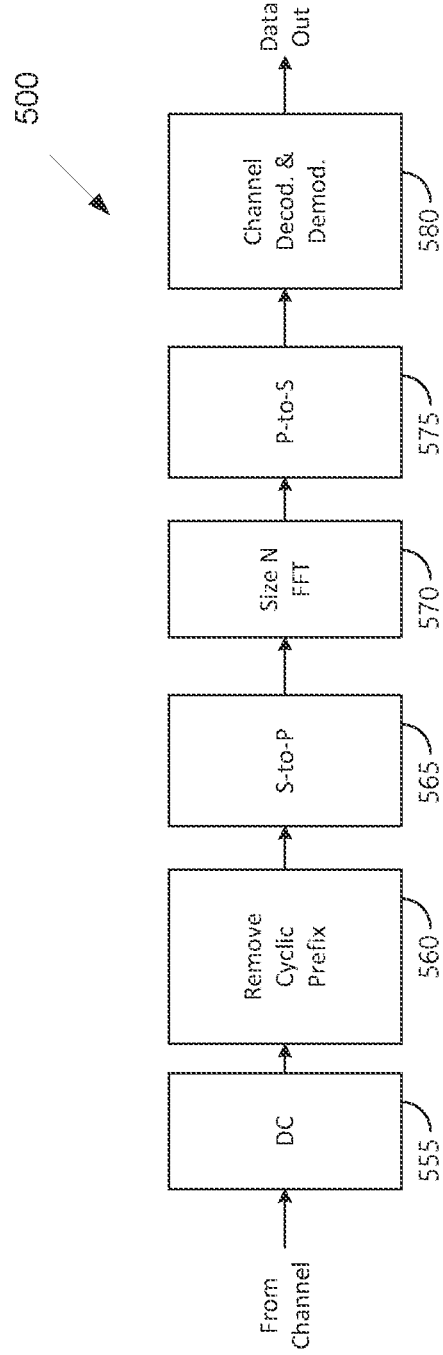

FIG. 4 and FIG. 5 illustrate example wireless transmit and receive paths according to the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications. In some embodiments, the receive path 500 is configured to support transmission window determination and time domain enhancements for a PSFCH in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of the present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In Rel-16 NR V2X, transmission and reception of SL signals and channels are based on resource pool(s) confined in the configured SL bandwidth part (BWP). In the frequency domain, a resource pool consists of a (pre-)configured number (e.g., sl-NumSubchannel) of contiguous sub-channels, wherein each sub-channel consists of a set of contiguous resource blocks (RBs) in a slot with size (pre-)configured by a higher layer parameter (e.g., sl-SubchannelSize). In a time domain, slots in a resource pool occur with a periodicity of 10240 ms, and slots including S-SSB, non-UL slots, and reserved slots are not applicable for a resource pool. The set of slots for a resource pool is further determined within the remaining slots, based on a (pre-)configured bitmap (e.g., sl-TimeResource). An illustration of a resource pool is shown in FIG. 6.

Figure 6:
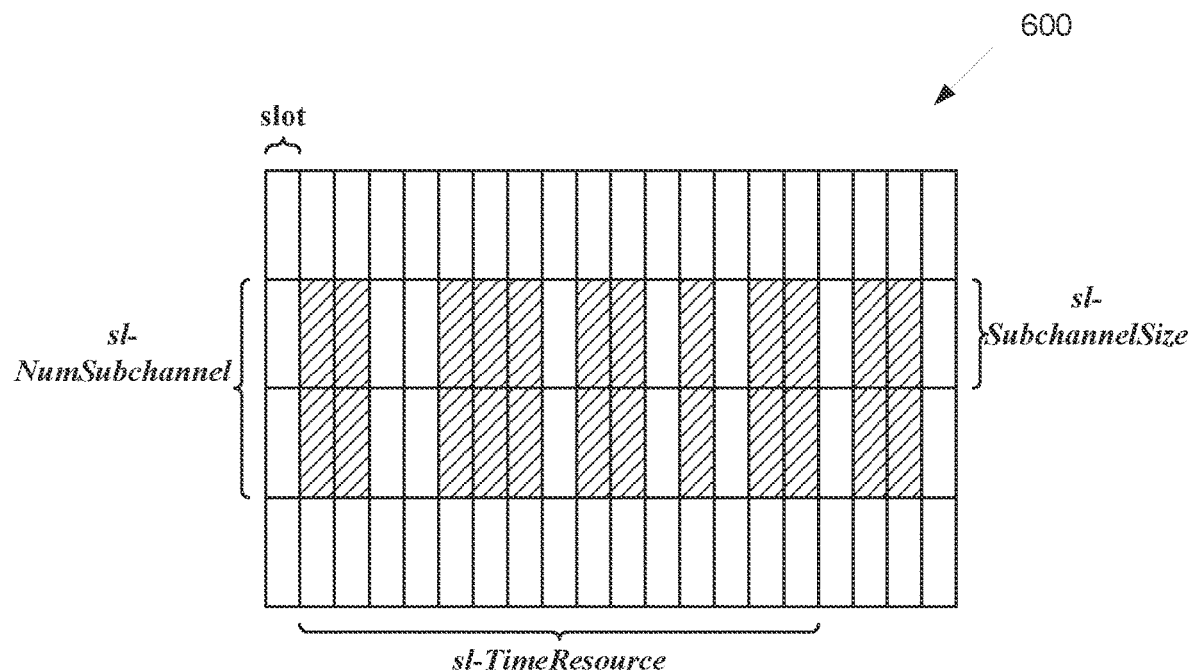
FIG. 6 illustrates an example of resource pool for V2X according to embodiments of the present disclosure.

FIG. 6 illustrates an example of resource pool for V2X 600 according to embodiments of the present disclosure. The embodiment of the resource pool for V2X 600 illustrated in FIG. 6 is for illustration only.

Transmission and reception of physical sidelink shared channel (PSSCH), physical sidelink control channel (PSCCH), and physical sidelink feedback channel (PSFCH) are confined within and associated with a resource pool, with parameters (pre-)configured by higher layers (e.g., SL-PSSCH-Config, SL-PSCCH-Config, and SL-PSFCH-Config, respectively).

A UE may transmit the PSSCH in consecutive symbols within a slot of the resource pool, and PSSCH resource allocation starts from the second symbol configured for sidelink, e.g., startSLsymbol+1, and the first symbol configured for sidelink is duplicated from the second configured for sidelink, for AGC purpose. The UE may not transmit PSSCH in symbols not configured for sidelink, or in symbols configured for PSFCH, or in the last symbol configured for sidelink, or in the symbol immediately preceding the PSFCH. The frequency domain resource allocation unit for PSSCH is the sub-channel, and the sub-channel assignment is determined using the corresponding field in the associated SCI.

For transmitting a PSCCH, the UE can be provided a number of symbols (either 2 symbols or 3 symbols) in a resource pool (e.g., sl-TimResourcePSCCH) starting from the second symbol configured for sidelink, e.g., startSLsymbol+1; and further provided a number of RBs in the resource pool (e.g., sl-FreqResourcePSCCH) starting from the lowest RB of the lowest sub-channel of the associated PSSCH.

In a time domain, the UE can be further provided a number of slots (e.g., sl-PSFCH-Period) in the resource pool for a period of PSFCH transmission occasion resources, and a slot in the resource pool is determined as containing a PSFCH transmission occasion, if the relative slot index within the resource pool is an integer multiple of the period of PSFCH transmission occasion, and with at least a number of slots provided by sl-MinTimeGapPSFCH after the last slot of the PSSCH reception. PSFCH is transmitted in two contiguous symbols in a slot, wherein the second symbol is with index startSLsymbols+lengthSLsymbols−2, and the two symbols are repeated. An illustration of the time domain resource determination for PSFCH is illustrated in FIG. 7.

Figure 7:
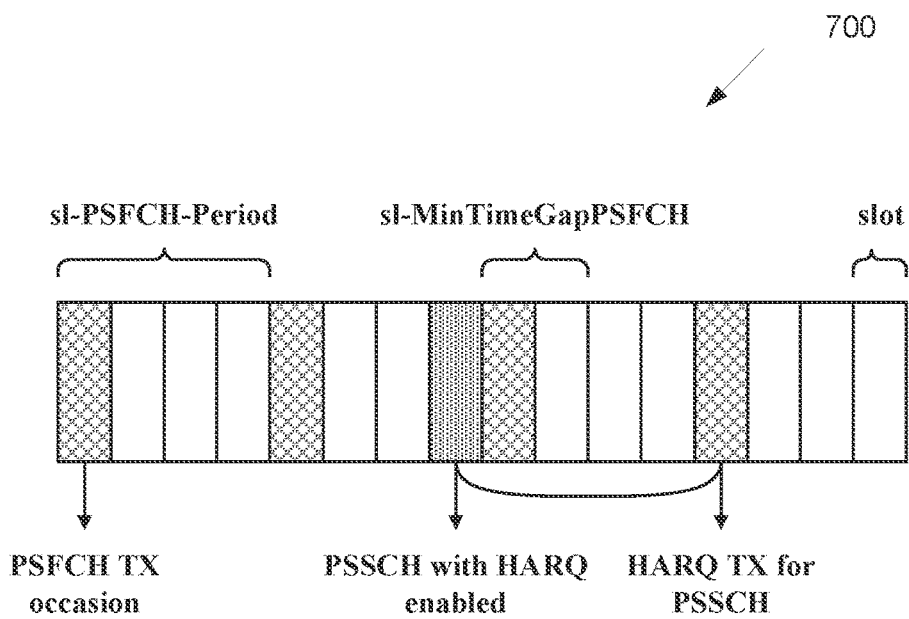
FIG. 7 illustrates an example of time domain resource determination for PSFCH according to embodiments of the present disclosure.

FIG. 7 illustrates an example of time domain resource determination for PSFCH 700 according to embodiments of the present disclosure. The embodiment of the time domain resource determination for PSFCH 700 illustrated in FIG. 7 is for illustration only.

In a frequency domain, a PSFCH is transmitted in a single PRB, wherein the PRB is determined from a set of $M_{PRB,\ set}^{PSFCH}$ PRBs based on an indication of a bitmap (e.g., sl-PSFCH-RB-Set). The UE determines a mapping from slot i (within $N_{PSSCH}^{PSFCH}$ slots provided by sl-PSFCH-Period) and sub-channel j (within $N_{subch}$ sub-channels provided by sl-NumSubchannel) to a subset of PRBs within the set of $M_{PRB,\ set}^{PSFCH}$, wherein the subset of PRBs are with index from $(i+j \cdot N_{PSSCH}^{PSFCH}) \cdot M_{subch,\ slot}^{PSFCH}$ to $(i+1+j \cdot N_{PSSCH}^{PSFCH}) \cdot M_{subch,\ slot}^{PSFCH} - 1$, with $M_{subch,\ slot}^{PSFCH} = M_{PRB,\ set}^{PSFCH} / (N_{subch} \cdot N_{PSSCH}^{PSFCH})$.

Figure 8:
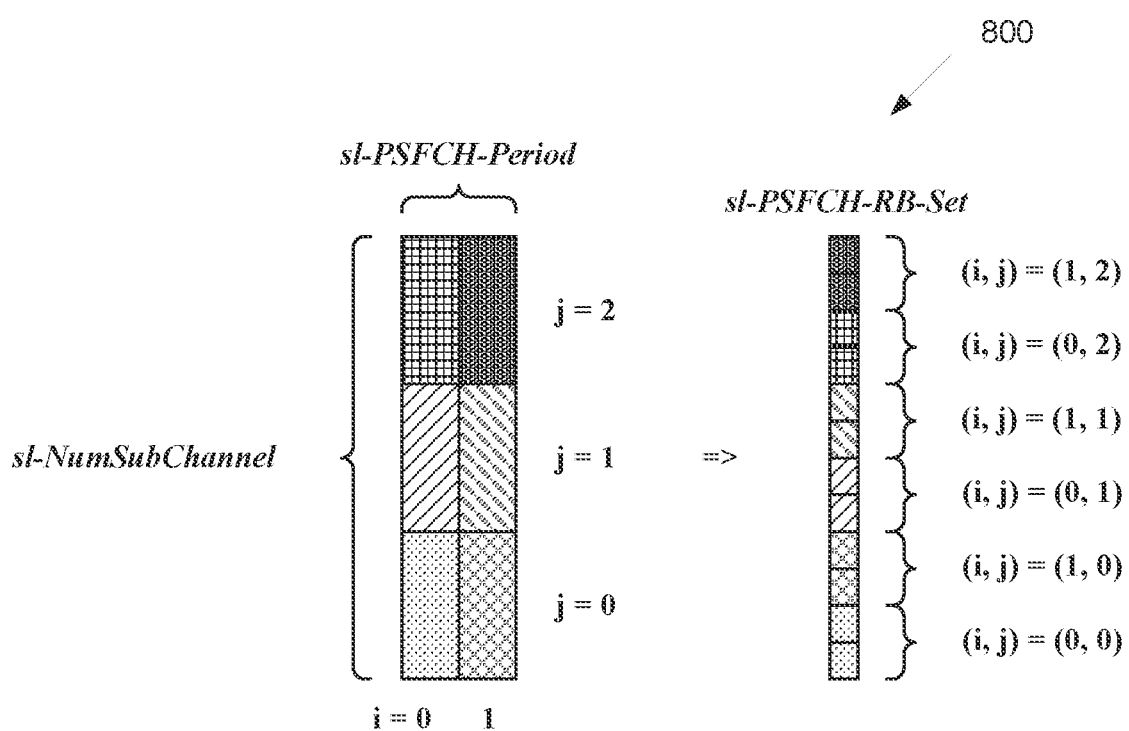
FIG. 8 illustrates an example of frequency domain resource determination for PSFCH according to embodiments of the present disclosure.

FIG. 8 illustrates an example of frequency domain resource determination for PSFCH 800 according to embodiments of the present disclosure. The embodiment of the frequency domain resource determination for PSFCH 800 illustrated in FIG. 8 is for illustration only.

An illustration of this mapping is shown in FIG. 8. The UE determines a number of PSFCH resources available for multiplexing HARQ-ACK information in a PSFCH transmission as $R_{PRB,\ CS}^{PSFCH} = N_{type}^{PSFCH} \cdot M_{subch,\ slot}^{PSFCH} \cdot N_{CS}^{PSFCH}$, wherein $N_{type}^{PSFCH}$ is determined based on the type of resources that the PSFCH is associated with, and $N_{CS}^{PSFCH}$ is a number of cyclic shift pairs for the resource pool provided by sl-NumMuxCS-Pair. The UE determines an index of a PSFCH resource for a PSFCH transmission in response to a PSSCH reception as $(P_{ID}+M_{ID})$ mod $R_{PRB,\ CS}^{PSFCH}$, where $P_{ID}$ is the source ID provided by the SCI scheduling the PSSCH, and $M_{ID}$ is the PSSCH receiver ID in groupcast SL transmission with ACK or NACK information in HARQ-feedback.

For a sidelink operation on an unlicensed or shared spectrum, there is a need to enhance the PSFCH in time domain and/or frequency domain and/or code domain, such that the transmitter and receiver of the PSFCH have no ambiguity in the resource for transmitting and/or receiving the PSFCH transmission. Also, due to a channel access procedure on an unlicensed or shared spectrum, there is an uncertainty for the transmission of PSFCH due to a failure of channel sensing, and hence, enhancement to compensate the transmission opportunity of PSFCH in time domain should be supported. It is noted that the embodiments and/or examples in the present disclosure can be used for sidelink operating on unlicensed or shared spectrum, but may be not limited to sidelink operating on unlicensed or shared spectrum.

The present disclosure provides embodiments for supporting time domain enhancement for a physical sidelink feedback channel, e.g., to be operated on the spectrum with shared channel access. More precisely, the following components are focused on in the present disclosure: (1) enhancement to time domain resource for PSFCH in a slot; (2) enhancement to time domain resource for PSFCH in a period; (3) enhancement to time domain resource for PSFCH in across periods; and (4) dynamic indication of the PSFCH transmission occasion.

The embodiments and examples in the present disclosure can be supported separately or combined. For one instance, enhancement to the time domain resource for PSFCH can be jointly supported with respect to at least one of the enhancement in a slot, the enhancement in a period, or the enhancement across periods. For another instance, the enhancement to the time domain resource for PSFCH in a static or semi-static way can be jointly supported with the enhancement to the time domain resource for PSFCH in a dynamic way.

In one embodiment, one or multiple time domain PSFCH transmission occasions can be supported in a slot (denoting the number of time domain PSFCH transmission occasions in a slot as $M_2$).

For one example, the location of the one or multiple time domain PSFCH transmission occasions in a slot can be determined based on the symbols pre-configured or configured for sidelink transmission in the slot.

For one instance, the starting symbol of the $(m_2+1)$ th time domain PSFCH transmission occasion in the slot can be determined as $S+L-N_{symb}^{PSFCH} \cdot (M_2-m_2)$, wherein S is the starting symbol for SL resource (e.g., sl-StartSymbol), L is the length of symbols for SL resource (e.g., sl-LengthSymbols), $N_{symb}^{PSFCH}$ is the number of symbols for a PSFCH occasion.

Figure 9:
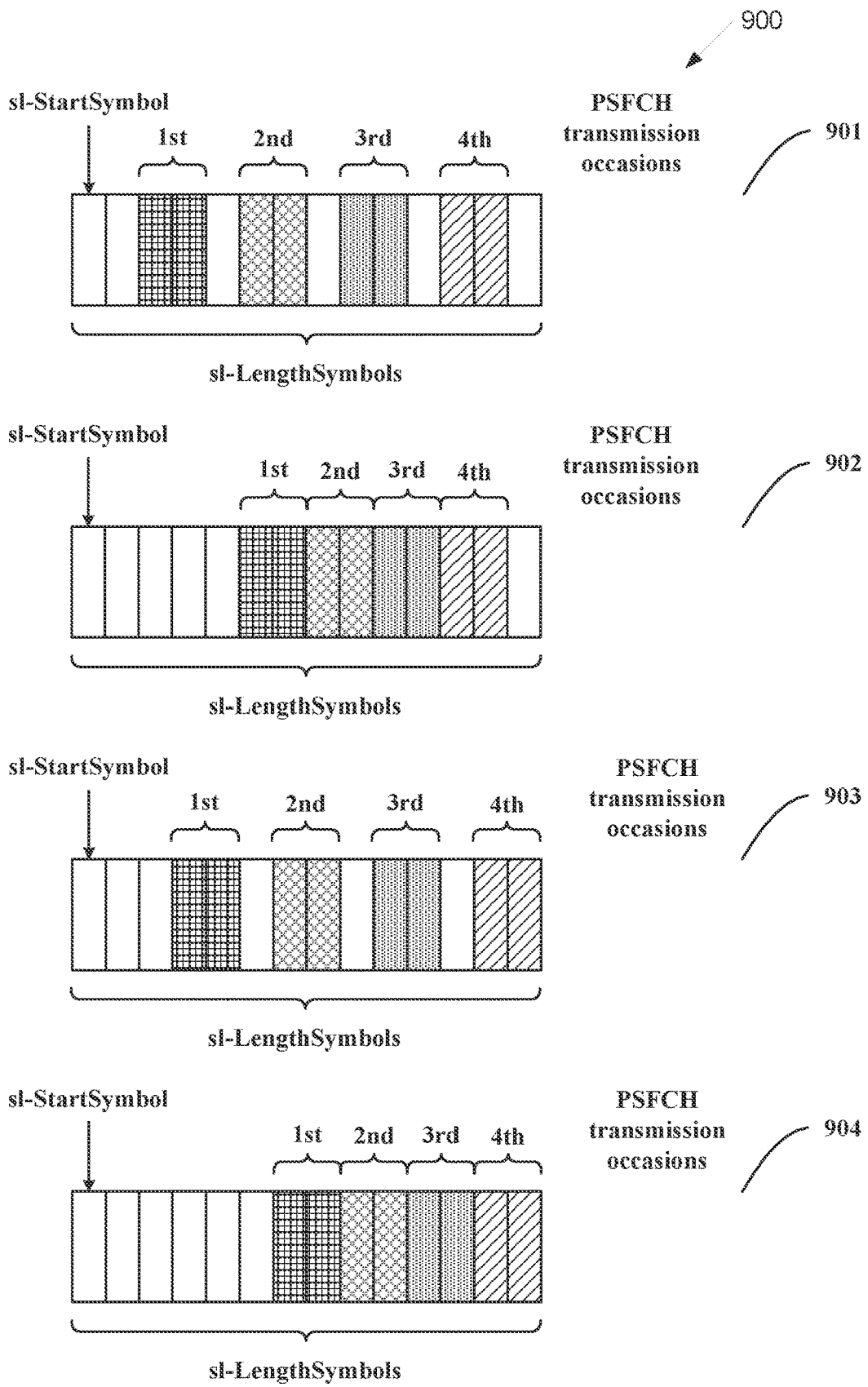
FIG. 9 illustrates an example of time domain enhancement for PSFCH TX occasions in a slot according to embodiments of the present disclosure.

FIG. 9 illustrates an example of time domain enhancement for PSFCH TX occasions 900 in a slot according to embodiments of the present disclosure. The embodiment of the time domain enhancement for PSFCH TX occasions 900 illustrated in FIG. 9 is for illustration only.

For one sub-instance, $N_{symb}^{PSFCH}=3$, and a PSFCH occasion includes 2 consecutive and repeated symbols for PSFCH transmission and 1 symbol reserved as gap. An illustration of this sub-instance is shown in 901 as illustrated in FIG. 9.

For another sub-instance, $N_{symb}^{PSFCH}=2$, and a PSFCH occasion includes 2 consecutive and repeated symbols for PSFCH transmission. An illustration of this sub-instance is shown in 904 of FIG. 9.

For another instance, the starting symbol of the $(m_2+1)$th time domain PSFCH transmission occasion in the slot can be determined as $S+L-N_{symb}^{PSFCH} \cdot (M_2-m_2)+1$, wherein S is the starting symbol for SL resource (e.g., sl-StartSymbol), L is the length of symbols for SL resource (e.g., sl-LengthSymbols), $N_{symb}^{PSFCH}$ is the number of symbols for a PSFCH occasion.

For one sub-instance, $N_{symb}^{PSFCH}=3$, and a PSFCH occasion includes 2 consecutive and repeated symbols for PSFCH transmission and 1 symbol reserved as gap. An illustration of this sub-instance is shown in 903 of FIG. 9.

For yet another instance, the starting symbol of the $(m_2+1)$th time domain PSFCH transmission occasion in the slot can be determined as $S+L-N_{symb}^{PSFCH} \cdot (M_2-m_2)-1$, wherein S is the starting symbol for SL resource (e.g., sl-StartSymbol), L is the length of symbols for SL resource (e.g., sl-LengthSymbols), $N_{symb}^{PSFCH}$ is the number of symbols for a PSFCH occasion.

For one sub-instance, $N_{symb}^{PSFCH}=2$, and a PSFCH occasion includes 2 consecutive and repeated symbols for PSFCH transmission. An illustration of this sub-instance is shown in 902 of FIG. 9.

For another example, the location of the one or multiple time domain PSFCH transmission occasions in a slot can be determined based on a bitmap. For instance, a bit in the bitmap taking value of 1 refers to a starting location of a corresponding time domain PSFCH transmission occasion, and the total number of bits taking value of 1 in the bitmap is $M_2$.

For one instance, the bitmap is with length same as the number of symbols in a slot.

For another instance, the bitmap is with length same as the number of symbols for SL resources in a slot (e.g., sl-LengthSymbols).

For yet another instance, the bitmap can be pre-configured.

For yet another instance, the bitmap can be configured by higher layer parameter.

For yet another instance, the bitmap can be provided by a MAC CE.

For yet another instance, the bitmap can be provided by a SCI format.

In one embodiment, a combination of time domain (e.g., a slot in a period) and frequency domain (e.g., a sub-channel) resource for PSSCH transmission that enables HARQ feedback transmission can correspond to a PSFCH resource in a number of candidate PSFCH resources periodically showing up in a resource pool, wherein the number of candidate PSFCH resources allocate in one or multiple time domain PSFCH transmission occasions in a period (e.g., denoting the number of time domain PSFCH transmission occasions in a period as M). The time domain PSFCH transmission occasion satisfies the minimum time domain gap duration between the PSSCH and its associated PSFCH, when a UE determines a time domain PSFCH transmission occasion to transmit PSFCH.

For one example, M can fixed in the specification.

For another example, M can be pre-configured.

For yet another example, M can be configured by higher layer parameter.

For yet another example, M can be provided by a MAC CE.

For yet another example, M can be provided by a SCI format.

Figure 10:
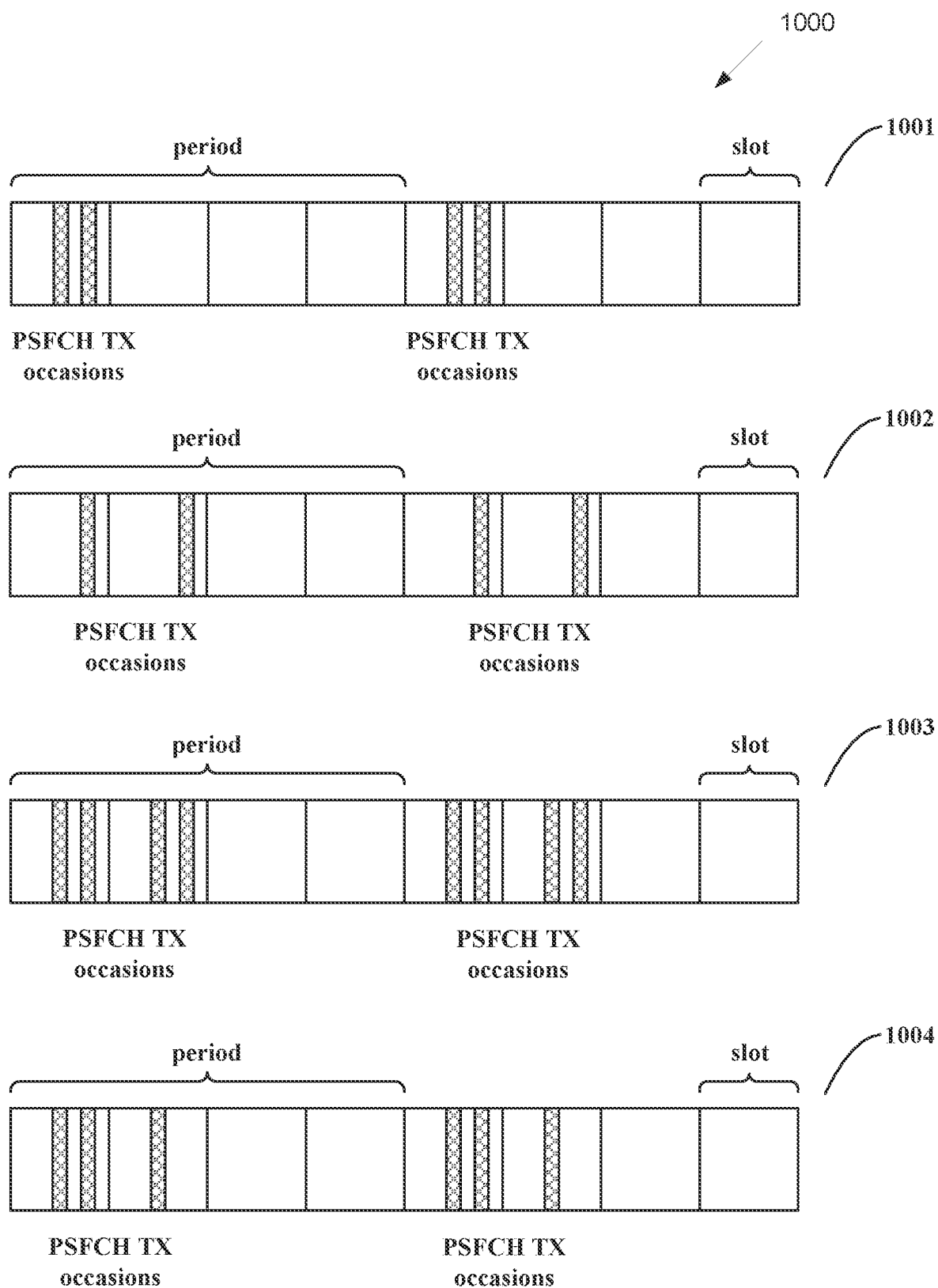
FIG. 10 illustrates an example of time domain enhancement for PSFCH TX occasions in a period according to embodiments of the present disclosure.

FIG. 10 illustrates an example of time domain enhancement for PSFCH TX occasions in a period 1000 according to embodiments of the present disclosure. The embodiment of the time domain enhancement for PSFCH TX occasions in a period 1000 illustrated in FIG. 10 is for illustration only.

In one example, the one or multiple time domain PSFCH transmission occasions can be within one slot within the period. An illustration of this example is shown in 1001 of FIG. 10.

For one instance, the slot index within the resource pool (e.g., slot index of the resource pool can be given by $t'^{SL}_k$) satisfies $k \bmod N_{slot}^{PSFCH}=c$.

For one sub-instance, c can fixed in the specification, e.g., c=0.

For another sub-instance, c can be pre-configured.

For yet another sub-instance, c can be configured by higher layer parameter.

For yet another sub-instance, c can be provided by a MAC CE.

For yet another sub-instance, c can be provided by a SCI format.

For one instance, the location of the time domain PSFCH transmission occasions within the slot can be according to the embodiments and examples in the present disclosure.

In another example, the one or multiple time domain PSFCH transmission occasions can be within one or multiple slots within the period, wherein each of the slot includes one-time domain PSFCH transmission occasion. An illustration of this example is shown in 1002 of FIG. 10.

For one instance, the index of the one or multiple slots within the resource pool (e.g., slot index of the resource pool can be given by $t'^{SL}_k$) satisfies $k \bmod N_{slot}^{PSFCH}=c$, where c can be one or multiple values determined from a bitmap (e.g., the bitmap is with length same as the number of slots in the period, and a bit taking value of 1 refers to a corresponding slot including a time domain PSFCH transmission occasion, and the total number of bits taking value of 1 is M).

For one sub-instance, the bitmap can be fixed in the specification.

For another sub-instance, the bitmap can be pre-configured.

For yet another sub-instance, the bitmap can be configured by higher layer parameter.

For yet another sub-instance, the bitmap can be provided by a MAC CE.

For yet another sub-instance, the bitmap can be provided by a SCI format.

For another instance, the index of the one or multiple slots within the resource pool (e.g., slot index of the resource pool can be given by $t'^{SL}_k$) satisfies $k \bmod N_{slot}^{PSFCH}=c$, where c can be one or multiple values determined based on the number of time domain PSFCH transmission occasions in a period (e.g., M). For one sub-instance, $c \in \{0, \ldots, M-1\}$.

In yet another example, the one or multiple time domain PSFCH transmission occasions can be within one or multiple slots within the period (e.g., denoting the number of slots as $M_1$), wherein each of the slot includes one or multiple time domain PSFCH transmission occasions (e.g., denoting the number of time domain PSFCH transmission occasions in a slot as $M_2$). For this sub-example, $M_1 \cdot M_2=M$. An illustration of this example is shown in 1003 of FIG. 10.

For one instance, $M_1$ can fixed in the specification.

For another instance, $M_1$ can be pre-configured.

For yet another instance, $M_1$ can be configured by higher layer parameter.

For yet another instance, $M_1$ can be provided by a MAC CE.

For yet another instance, $M_1$ can be provided by a SCI format.

For one instance, $M_2$ can fixed in the specification.

For another instance, $M_2$ can be pre-configured.

For yet another instance, $M_2$ can be configured by higher layer parameter.

For yet another instance, $M_2$ can be provided by a MAC CE.

For yet another instance, $M_2$ can be provided by a SCI format.

For one instance, the index of the one or multiple slots within the resource pool (e.g., slot index of the resource pool can be given by $t'^{SL}_k$) satisfies k mod $N_{slot}^{PSFCH}$=c, where c can be one or multiple values determined from a bitmap (e.g., the bitmap is with length same as the number of slots in the period, and a bit taking value of 1 refers to a corresponding slot including a time domain PSFCH transmission occasion, and the total number of bits taking value of 1 is $M_1$).

For one sub-instance, the bitmap can be fixed in the specification.

For another sub-instance, the bitmap can be pre-configured.

For yet another sub-instance, the bitmap can be configured by higher layer parameter.

For yet another sub-instance, the bitmap can be provided by a MAC CE.

For yet another sub-instance, the bitmap can be provided by a SCI format.

For another instance, the index of the one or multiple slots within the resource pool (e.g., slot index of the resource pool can be given by $t'^{SL}_k$) satisfies k mod $N_{slot}^{PSFCH}$=c, where c can be one or multiple values determined based on $M_1$. For one sub-instance, $c \in \{0, \ldots, M_1-1\}$.

For one instance, the location of the time domain PSFCH transmission occasions within the slot can be according to the embodiments and examples in the present disclosure.

In yet another example of this embodiment, the one or multiple time domain PSFCH transmission occasions can be within one or multiple slots within the period (e.g., denoting the number of slots as $M_1$), wherein each of the slot includes one or multiple time domain PSFCH transmission occasions (e.g., denoting the number of time domain PSFCH transmission occasions in a slot as $M_2$). The M time domain PSFCH transmission occasions are selected from the $M_1 \cdot M_2$ candidate occasions (e.g., selected as the first M occasions, or the last M occasions). An illustration of this example is shown in 1004 of FIG. 10.

For one instance, $M_1$ can fixed in the specification.

For another instance, $M_1$ can be pre-configured.

For yet another instance, $M_1$ can be configured by higher layer parameter.

For yet another instance, $M_1$ can be provided by a MAC CE.

For yet another instance, $M_1$ can be provided by a SCI format.

For one instance, $M_2$ can fixed in the specification.

For another instance, $M_2$ can be pre-configured.

For yet another instance, $M_2$ can be configured by higher layer parameter.

For yet another instance, $M_2$ can be provided by a MAC CE.

For yet another instance, $M_2$ can be provided by a SCI format.

For one instance, the index of the one or multiple slots within the resource pool (e.g., slot index of the resource pool can be given by $t'^{SL}_k$) satisfies k mod $N_{slot}^{PSFCH}$=c, where c can be one or multiple values determined from a bitmap (e.g., the bitmap is with length same as the number of slots in the period, and a bit taking value of 1 refers to a corresponding slot including a time domain PSFCH transmission occasion, and the total number of bits taking value of 1 is $M_1$).

For one sub-instance, the bitmap can be fixed in the specification.

For another sub-instance, the bitmap can be pre-configured.

For yet another sub-instance, the bitmap can be configured by higher layer parameter.

For yet another sub-instance, the bitmap can be provided by a MAC CE.

For yet another sub-instance, the bitmap can be provided by a SCI format.

For another instance, the index of the one or multiple slots within the resource pool (e.g., slot index of the resource pool can be given by $t'^{SL}_k$) satisfies k mod $N_{slot}^{PSFCH}$=c, where c can be one or multiple values determined based on $M_1$. For one sub-instance, $c \in \{0, \ldots, M_1-1\}$.

For one instance, the location of the time domain PSFCH transmission occasions within the slot can be according to the embodiments and examples in the present disclosure.

Figure 11:
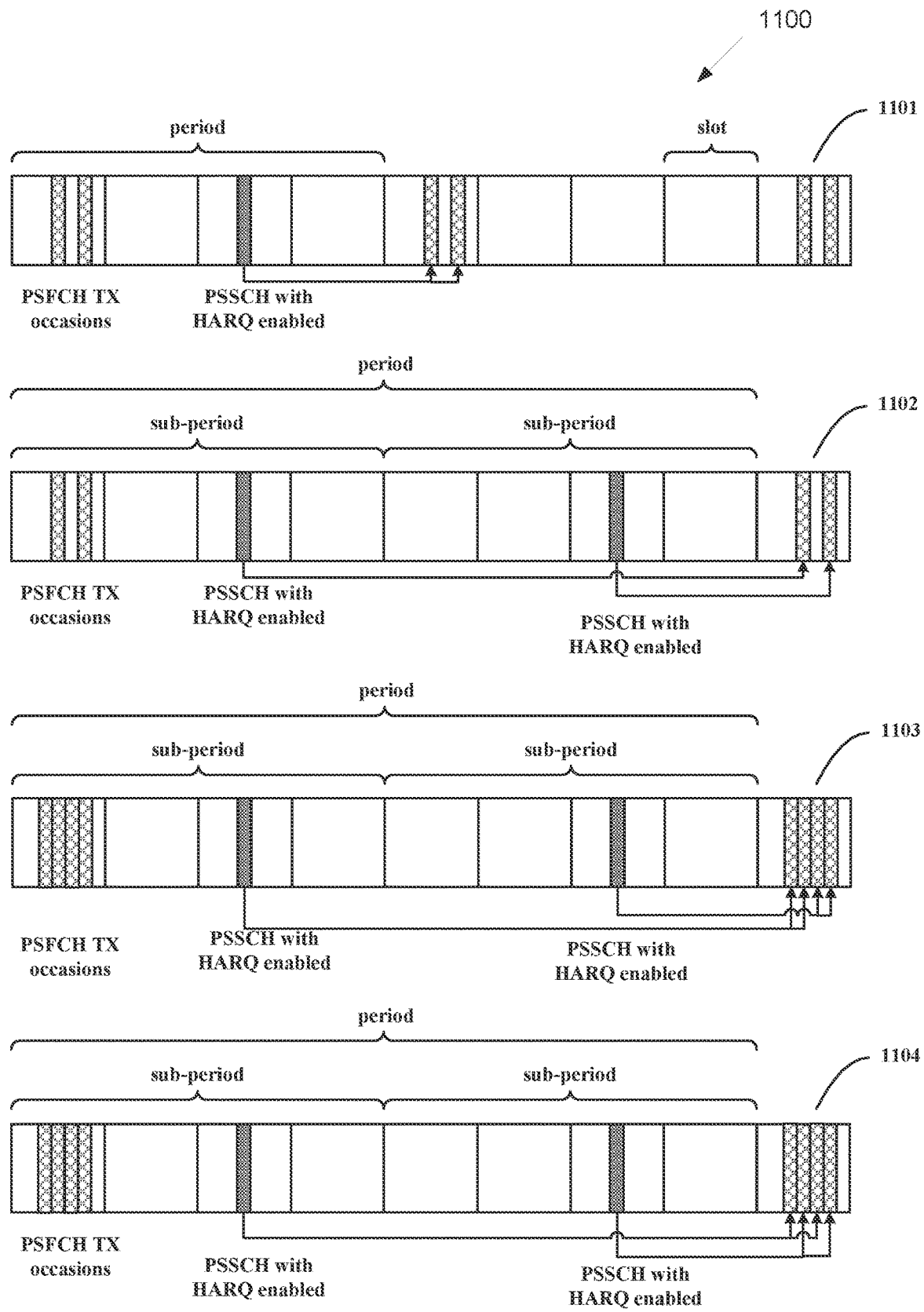
FIG. 11 illustrates another example of time domain enhancement for PSFCH TX occasions in a period according to embodiments of the present disclosure.

FIG. 11 illustrates another example of time domain enhancement for PSFCH TX occasions in a period 1100 according to embodiments of the present disclosure. The embodiment of the time domain enhancement for PSFCH TX occasions in a period 1100 illustrated in FIG. 11 is for illustration only.

In one example of the present embodiment, the period (e.g., denoted by $N_{slot}^{PSFCH}$) can be pre-configured or configured by higher layer parameter (e.g., sl-PSFCH-Period). An illustration of this example is shown in 1101 of FIG. 11.

In one example, a UE determines a number of PSFCH resources available for multiplexing HARQ-ACK information in a PSFCH transmission as $R_{TO,PRB,CS}^{PSFCH} = N_{TO}^{PSFCH} \cdot N_{PRB}^{PSFCH} \cdot N_{CS}^{PSFCH}$, wherein $N_{TO}^{PSFCH}$ is the assocatied number of time domain PSFCH transmission occasions with $N_{TO}^{PSFCH}=M$ in this example, $N_{PRB}^{PSFCH}$ is the associated number of frequency domain resources, and $N_{CS}^{PSFCH}$ is the associated number of cyclic shift pairs in code domain.

A combination of time domain (e.g., a slot index i within a period) and frequency domain (e.g., a sub-channel with index j) resource for PSSCH transmission that enables HARQ feedback transmission can correspond to a set of time and frequency domain resources for PSFCH transmission occasion, wherein the set of time and frequency domain resources for PSFCH transmission occasion includes time domain resources from all the M PSFCH transmission occasions.

For one instance, the mapping is in the increasing order of i first and j secondary, and the selection of the set of time and frequency domain resources for PSFCH transmission occasion is in the increasing order of time domain PSFCH transmission occasion first and then in the increasing order of frequency domain resources (e.g., consecutive number of PRBs or interlace based PRBs).

For another instance, the mapping is in the increasing order of i first and j secondary, and the selection of the set of time and frequency domain resources for PSFCH transmission occasion is in the increasing order of frequency domain resources (e.g., consecutive number of PRBs or interlace based PRBs) first and then in the increasing order of time domain PSFCH transmission occasion.

In another example, the UE can select one of the associated time domain PSFCH transmission occasions to transmit the HARQ feedback for a PSSCH (e.g., subject to channel access procedure on the unlicensed band), and determines a number of PSFCH resources available for multiplexing HARQ-ACK information in a PSFCH transmission as $R_{TO,PRB,CS}^{PSFCH} = N_{TO}^{PSFCH} \cdot N_{PRB}^{PSFCH} \cdot N_{CS}^{PSFCH}$, wherein $N_{TO}^{PSFCH}$ is the assocatied number of time domain PSFCH transmission occasions with $N_{TO}^{PSFCH}=1$ in this example, $N_{PRB}^{PSFCH}$ is the associated number of frequency domain resources, and $N_{CS}^{PSFCH}$ is the associated number of cyclic shift pairs in code domain.

A combination of time domain (e.g., a slot index i within a period) and frequency domain (e.g., a sub-channel with index j) resource for PSSCH transmission that enables HARQ feedback transmission can correspond to a set of time and frequency domain resources for PSFCH transmission occasion, wherein the set of time and frequency domain resources for PSFCH transmission occasion includes time domain resources from the selected one of the M PSFCH transmission occasions.

For one instance, the frequency domain resource for PSFCH transmission associated with a combination (i,j) in all the time domain PSFCH transmission occasions is the same.

For another instance, the frequency domain resource for PSFCH transmission associated with a combination (i,j) in the time domain PSFCH transmission occasions can be different. For instance, for the (m+1)th time domain PSFCH transmission occasion can have an offset on the frequency domain resource for PSFCH transmission, wherein the offset is determined based on m.

In another example, the period (e.g., denoted by $N_{slot}^{PSFCH}$) can be determined as a number of sub-periods, wherein the duration of the sub-period can be pre-configured or configured by a higher layer parameter (e.g., sl-PSFCH-Period), and the number of sub-periods within the period can be denoted as $\overline{R}_{slot}^{PSFCH}$.

For one sub-example, $\overline{R}_{slot}^{PSFCH}$ can fixed in the specification (e.g., $\overline{R}_{slot}^{PSFCH}=1, 2, 4,$ or 8).

For another sub-example, $\overline{R}_{slot}^{PSFCH}$ can be pre-configured (e.g., $\overline{R}_{slot}^{PSFCH}$ is from the set or a subset of {1, 2, 4, 8}).

For yet another sub-example, $\overline{R}_{slot}^{PSFCH}$ can be configured by higher layer parameter (e.g., $\overline{R}_{slot}^{PSFCH}$ is from the set or a subset of {1, 2, 4, 8}).

For yet another sub-example, $\overline{R}_{slot}^{PSFCH}$ can be provided by a MAC CE (e.g., $\overline{R}_{slot}^{PSFCH}$ is from the set or a subset of {1, 2, 4, 8}).

For yet another sub-example, $\overline{R}_{slot}^{PSFCH}$ can be provided by a SCI format (e.g., $\overline{R}_{slot}^{PSFCH}$ is from the set or a subset of {1, 2, 4, 8}).

In one example, $\overline{R}_{slot}^{PSFCH}=M$, and a UE determines a number of PSFCH resources available for multiplexing HARQ-ACK information in a PSFCH transmission as $R_{TO,PRB,CS}^{PSFCH}=N_{TO}^{PSFCH} \cdot N_{PRB}^{PSFCH} \cdot N_{CS}^{PSFCH}$, wherein $N_{TO}^{PSFCH}$ is the assocatied number of time domain PSFCH transmission occasions with $N_{TO}^{PSFCH}=1$ in this example, $N_{PRB}^{PSFCH}$ is the associated number of frequency domain resources, and $N_{CS}^{PSFCH}$ is the associated number of cyclic shift pairs in code domain. The UE assumes a one-to-one mapping between a sub-period within the period and a time domain PSFCH transmission occasion, e.g., the (m+1)th sub-period within the period can be associated with the (m+1)th time domain PSFCH transmission occasion, where 0≤m≤M−1. An illustration of this example is shown in 1102 of FIG. 11.

A combination of time domain (e.g., a slot index i within a sub-period) and frequency domain (e.g., a sub-channel with index j) resource for PSSCH transmission that enables HARQ feedback transmission can correspond to a set of time and frequency domain resources for PSFCH transmission occasion, wherein the set of time and frequency domain resources for PSFCH transmission occasion includes time domain resources from the selected one of the M PSFCH transmission occasions.

In one example, $R_{slot}^{PSFCH}=\overline{M}$, and a UE determines a number of PSFCH resources available for multiplexing HARQ-ACK information in a PSFCH transmission as $R_{TO,PRB,CS}^{PSFCH}=N_{TO}^{PSFCH} \cdot N_{PRB}^{PSFCH} \cdot N_{CS}^{PSFCH}$, wherein $N_{TO}^{PSFCH}$ is the assocatied number of time domain PSFCH transmission occasions with $N_{TO}^{PSFCH}=M/\overline{M}$ in this example, $N_{PRB}^{PSFCH}$ is the associated number of frequency domain resources, and $N_{CS}^{PSFCH}$ is the associated number of cyclic shift pairs in code domain. The UE assumes a mapping between a sub-period within the period and a set of time domain PSFCH transmission occasions, e.g., the ($\overline{m}$+1)th sub-period within the period can be associated with the ($\overline{m}M/\overline{M}$+1) th to ($\overline{m}$+1)M/$\overline{M}$ th time domain PSFCH transmission occasions, where 0≤$\overline{m}$≤$\overline{M}$−1. An illustration of this example is shown in 1103 of FIG. 11.

A combination of time domain (e.g., a slot index i within the ($\overline{m}$+1)th sub-period) and frequency domain (e.g., a sub-channel with index j) resource for PSSCH transmission that enables HARQ feedback transmission can correspond to a set of time and frequency domain resources for PSFCH transmission occasion, wherein the set of time and frequency domain resources for PSFCH transmission occasion includes time domain resources from all the determined M/$\overline{M}$ PSFCH transmission occasions.

For one instance, the mapping is in the increasing order of i first and j secondary, and the selection of the set of time and frequency domain resources for PSFCH transmission occasion (within the ($\overline{m}M/\overline{M}$+1)th to ($\overline{m}$+1)M/$\overline{M}$th time domain PSFCH transmission occasions) is in the increasing order of time domain PSFCH transmission occasion first and then in the increasing order of frequency domain resources (e.g., consecutive number of PRBs or interlace based PRBs).

For another instance, the mapping is in the increasing order of i first and j secondary, and the selection of the set of time and frequency domain resources for PSFCH transmission occasion (within the ($\overline{m}M/\overline{M}$+1) th to ($\overline{m}$+1)M/$\overline{M}$ th time domain PSFCH transmission occasions) is in the increasing order of frequency domain resources (e.g., consecutive number of PRBs or interlace based PRBs) first and then in the increasing order of time domain PSFCH transmission occasion.

In one example with one or multiple time domain PSFCH transmission occasions located within one or multiple slots within the period (e.g., denoting the number of slots as $M_1$), $\overline{M}$ can be the same as $M_1$.

In one example, for the embodiments and examples in the present disclosure with one or multiple time domain PSFCH transmission occasions located within one slot within the period (e.g., denoting the number of time domain PSFCH transmission occasions as $M_2$), $\overline{M}$ can be the same as $M_2$.

In yet another example, $R_{slot}^{PSFCH}=\overline{M}$, and a UE determines a number of PSFCH resources available for multiplexing HARQ-ACK information in a PSFCH transmission as $R_{TO,PRB,CS}^{PSFCH}=N_{TO}^{PSFCH} \cdot N_{PRB}^{PSFCH} \cdot N_{CS}^{PSFCH}$, wherein $N_{TO}^{PSFCH}$ is the assocatied number of time domain PSFCH transmission occasions with $N_{TO}^{PSFCH}=M/\overline{M}$ in this example, $N_{PRB}^{PSFCH}$ is the associated number of frequency domain resources, and $N_{CS}^{PSFCH}$ is the associated number of cyclic shift pairs in code domain.

The UE assumes a mapping between a sub-period within the period and a set of time domain PSFCH transmission occasions, e.g., the ($\overline{m}$+1)th sub-period within the period can be associated with the time domain PSFCH transmission occasion(s) with index(es) m satisfying m mod M/$\overline{M}$=$\overline{m}$, where 0≤$\overline{m}$≤$\overline{M}$−1. An illustration of this example is shown in 1104 of FIG. 11.

A combination of time domain (e.g., a slot index i within the ($\overline{m}$+1)th sub-period) and frequency domain (e.g., a sub-channel with index j) resource for PSSCH transmission that enables HARQ feedback transmission can correspond to a set of time and frequency domain resources for PSFCH transmission occasion, wherein the set of time and frequency domain resources for PSFCH transmission occasion includes time domain resources from all the determined M/$\overline{M}$ PSFCH transmission occasions.

For one instance, the mapping is in the increasing order of i first and j secondary, and the selection of the set of time and frequency domain resources for PSFCH transmission occasion (within the time domain PSFCH transmission occasion(s) with index(es) m satisfying m mod M/$\overline{M}$=$\overline{m}$) is in the increasing order of time domain PSFCH transmission occasion first and then in the increasing order of frequency domain resources (e.g., consecutive number of PRBs or interlace based PRBs).

For another instance, the mapping is in the increasing order of i first and j secondary, and the selection of the set of time and frequency domain resources for PSFCH transmission occasion (within the time domain PSFCH transmission occasion(s) with index(es) m satisfying m mod M/$\overline{M}$=$\overline{m}$) is in the increasing order of frequency domain resources (e.g., consecutive number of PRBs or interlace based PRBs) first and then in the increasing order of time domain PSFCH transmission occasion.

In one example with one or multiple time domain PSFCH transmission occasions located within one or multiple slots within the period (e.g., denoting the number of slots as $M_1$), $\overline{M}$ can be the same as $M_1$.

For another example, with one or multiple time domain PSFCH transmission occasions located within one slot within the period (e.g., denoting the number of time domain PSFCH transmission occasions as $M_2$), $\overline{M}$ can be the same as $M_2$.

In one embodiment, all or a subset of the one or multiple time domain PSFCH transmission occasions can share a channel occupancy.

For one instance, if a transmitter of a PSFCH is aware of being in a channel occupancy, the transmitter can perform a Type 2C channel access procedure to access the channel (e.g., including a time duration spanned by sensing slots that are sensed to be idle before a SL transmission to be deterministic as 0, i.e., without sensing). For another instance, the Type 2C channel access procedure can be applicable with a limitation on the duration of the gap from the end of the previous transmission on the channel to be no larger than a first predefined value (e.g., 16 us).

For another instance, if a transmitter of a PSFCH is aware of being in a channel occupancy, the transmitter can perform a Type 2B channel access procedure to access the channel (e.g., including a time duration spanned by sensing slots that are sensed to be idle before a SL transmission to be deterministic as 16 us). For one instance, the Type 2B channel access procedure can be applicable with a limitation on the duration of the gap from the end of the previous transmission on the channel as a first predefined value (e.g., 16 us).

For yet another instance, if a transmitter of a PSFCH is aware of being in a channel occupancy, the transmitter can perform a Type 2A channel access procedure to access the channel (e.g., including a time duration spanned by sensing slots that are sensed to be idle before a SL transmission to be deterministic as 25 us). For one instance, the Type 2A channel access procedure can be applicable with a limitation on the duration of the gap from the end of the previous transmission on the channel as a second predefined value (e.g., 25 us).

In one embodiment, a combination of time domain (e.g., a slot in a period) and frequency domain (e.g., a sub-channel) resource for PSSCH transmission that enables HARQ feedback transmission can correspond to a PSFCH resource in a number of time domain PSFCH transmission occasions, wherein the number of time domain PSFCH transmission occasions allocate across periods for the selection of the combination of time domain (e.g., a slot in a period) and frequency domain (e.g., a sub-channel) resource for PSSCH transmission that enables HARQ feedback transmission.

In one embodiment, for a given PSSCH transmission that enables HARQ feedback, its associated number of time domain PSFCH transmission occasions are a subset of the time domain PSFCH transmission occasions periodically showing up in the periods, wherein in each period, the time domain PSFCH transmission occasion is associated with the PSSCH transmission based a mapping.

In one embodiment, for a given PSSCH transmission that enables HARQ feedback, its associated number of time domain PSFCH transmission occasions can be within a window, e.g., denoted as PSFCH transmission window. The PSFCH transmission window can be defined using at least one of a periodicity, an offset, a duration, or an interval between two neighboring PSFCH transmission occasions within the window. An illustration of the PSFCH transmission window is shown in FIG. 12.

Figure 12:
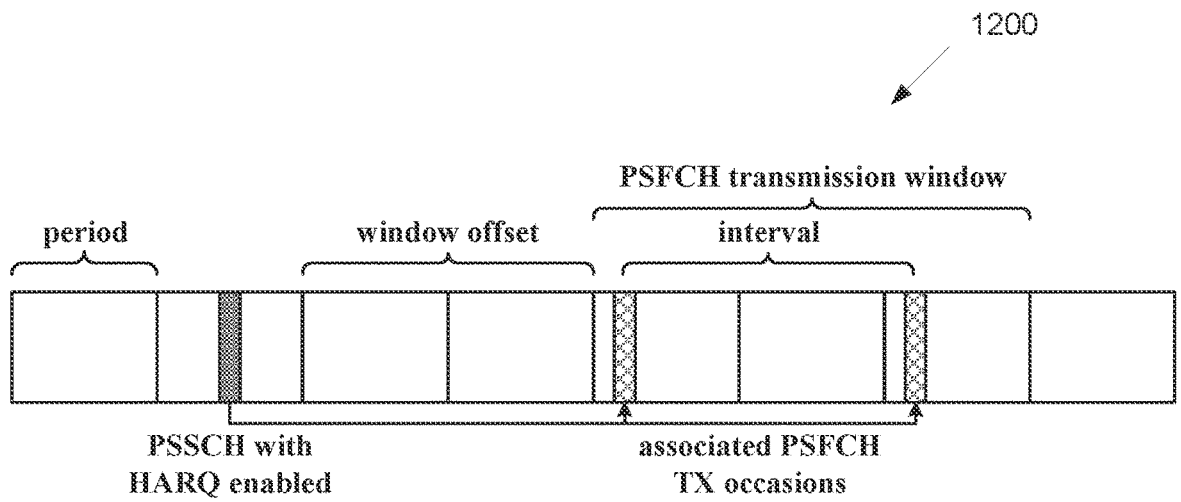
FIG. 12 illustrates yet an example of time domain enhancement for PSFCH TX occasions across periods according to embodiments of the present disclosure.

FIG. 12 illustrates yet an example of time domain enhancement for PSFCH TX occasions across periods 1200 according to embodiments of the present disclosure. The embodiment of the time domain enhancement for PSFCH TX occasions across periods 1200 illustrated in FIG. 12 is for illustration only.

For one example, at least one of the periodicity of the window, the offset of the window, the duration of the window, or an interval between two neighboring PSFCH transmission occasions within the window can be fixed in the specification.

For another example, at least one of the periodicity of the window, the offset of the window, the duration of the window, or an interval between two neighboring PSFCH transmission occasions within the window can be pre-configured.

For yet another example, at least one of the periodicity of the window, the offset of the window, the duration of the window, or an interval between two neighboring PSFCH transmission occasions within the window can be configured by higher layer parameter.

For yet another example, at least one of the periodicity of the window, the offset of the window, the duration of the window, or an interval between two neighboring PSFCH transmission occasions within the window can be provided by a MAC CE.

For yet another example, at least one of the periodicity of the window, the offset of the window, the duration of the window, or an interval between two neighboring PSFCH transmission occasions within the window can be provided by a SCI format.

For one example, the unit of the periodicity of the window can be the period for the defining the mapping between a combination of time domain (e.g., a slot in the period) and frequency domain (e.g., a sub-channel) resource for PSSCH and a PSFCH resource in the period.

For another example, a given PSSCH transmission that enables HARQ feedback can have one associated PSFCH transmission window, and the periodicity of the window is not applicable.

For one example, the unit of the offset of the window can be the period for the defining the mapping between a combination of time domain (e.g., a slot in the period) and frequency domain (e.g., a sub-channel) resource for PSSCH and a PSFCH resource in the period. For one instance, the offset of the window as 0 means the first associated PSFCH transmission occasion locates in the same period as the PSSCH transmission.

For one example, the unit of the duration of the window can be the period for the defining the mapping between a combination of time domain (e.g., a slot in the period) and frequency domain (e.g., a sub-channel) resource for PSSCH and a PSFCH resource in the period.

For another example, the unit of the duration of the window can be a slot.

For yet another example, the duration of the window can be expressed as a number of associated PSFCH transmission occasions.

For one example, the unit of interval between two neighboring PSFCH transmission occasions within the window can be the period for the defining the mapping between a combination of time domain (e.g., a slot in the period) and frequency domain (e.g., a sub-channel) resource for PSSCH and a PSFCH resource in the period. For one instance, the interval can be a period. For another instance, the interval can be a number of periods.

For another example, the unit of interval between two neighboring PSFCH transmission occasions within the window can be a slot.

For one example, the UE can determine the locations of the associated PSFCH transmission occasions based on the at least one of the periodicity of the window, the offset of the window, the duration of the window, or an interval between two neighboring PSFCH transmission occasions within the window. For further embodiments, the first associated PSFCH transmission occasion can be further subject to satisfy a minimum gap duration after the end of the PSSCH transmission.

Figure 13:
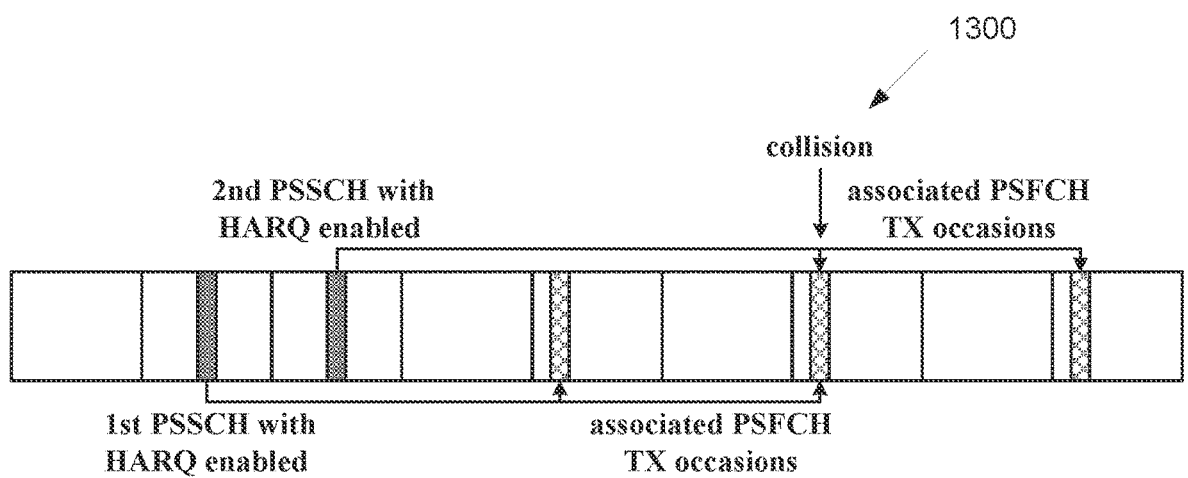
FIG. 13 illustrates an example of collided PSFCH TX occasions across periods according to embodiments of the present disclosure.

FIG. 13 illustrates an example of collided PSFCH TX occasions across periods 1300 according to embodiments of the present disclosure. The embodiment of the collided PSFCH TX occasions across periods 1300 illustrated in FIG. 13 is for illustration only.

For one embodiment, the associated PSFCH transmission occasions for a first PSSCH transmission can collide with the associated PSFCH transmission occasions for a second PSSCH transmission. An illustration of this collision is shown in FIG. 13.

In one example, when a UE determines a same PSFCH transmission occasion for the first PSSCH transmission and the second PSSCH transmission, the UE transmits the HARQ feedback information corresponding to the first PSSCH transmission in the PSFCH transmission occasion (e.g., prioritize to transmit the HARQ feedback information corresponding to the earlier PSSCH transmission), and determines another PSFCH transmission occasion for the second PSSCH transmission.

In another example, when a UE determines a same PSFCH transmission occasion for the first PSSCH transmission and the second PSSCH transmission, the UE transmits the HARQ feedback information corresponding to the second PSSCH transmission in the PSFCH transmission occasion (e.g., prioritize to transmit the HARQ feedback information corresponding to the later PSSCH transmission), and determines another PSFCH transmission occasion for the first PSSCH transmission.

In yet another example, when a UE determines a same PSFCH transmission occasion for the first PSSCH transmission and the second PSSCH transmission, the UE transmits the HARQ feedback information corresponding to both PSSCH transmissions in the PSFCH transmission occasion.

In one example, the UE transmits the HARQ feedback information corresponding to both PSSCH transmissions using a PSFCH format that enables multiple HARQ feedback information bits.

In another example, the UE multiplexes the HARQ feedback information corresponding to both PSSCH transmissions into the same time domain resources (e.g., in the same time domain PSFCH transmission occasion), and uses different frequency domain resources (e.g., non-overlapping PRBs or non-overlapping interlaces) corresponding to the first and second PSSCH transmissions.

In another example, the UE multiplexes the HARQ feedback information corresponding to both PSSCH transmissions into the same time domain resources (e.g., in the same time domain PSFCH transmission occasion) and frequency domain resources (e.g., in the same PRBs or interlaces), and uses different cyclic shift pairs corresponding to the first and second PSSCH transmissions.

For one instance, the different cyclic shift pair can be associated with the period that including the PSSCH transmission. If the index of the period that including the first PSSCH transmission is $n_1$, and the index of the period that including the second PSSCH transmission is $n_2$, then the cyclic shift pair corresponding to the first PSSCH transmission is determined based on $n_1$, and the cyclic shift pair corresponding to the second PSSCH transmission is determined based on $n_2$.

For another instance, the different cyclic shift pair can be associated with the index of the PSFCH transmission occasion within all the associated PSFCH transmission occasions. If there are M associated PSFCH transmission occasions for a PSSCH transmission, and the $(m_1+1)$th PSFCH transmission occasion for the first PSSCH transmission collides with the $(m_2+1)$th PSFCH transmission occasion for the second PSSCH transmission, then the cyclic shift pair corresponding to the first PSSCH transmission is determined based on $m_1$, and the cyclic shift pair corresponding to the second PSSCH transmission is determined based on $m_2$, wherein $0 \le m_1 \le M-1$, and $0 \le m_2 \le M-1$.

In another embodiment, all or a subset of the one or multiple time domain PSFCH transmission occasions can share a channel occupancy.

For one instance, if a transmitter of a PSFCH is aware of being in a channel occupancy, the transmitter can perform a Type 2C channel access procedure to access the channel (e.g., including a time duration spanned by sensing slots that are sensed to be idle before a SL transmission to be deterministic as 0, i.e., without sensing). For further embodiments, the Type 2C channel access procedure can be applicable with a limitation on the duration of the gap from the end of the previous transmission on the channel to be no larger than a first predefined value (e.g., 16 us).

For another instance, if a transmitter of a PSFCH is aware of being in a channel occupancy, the transmitter can perform a Type 2B channel access procedure to access the channel (e.g., including a time duration spanned by sensing slots that are sensed to be idle before a SL transmission to be deterministic as 16 us). For further instance, the Type 2B channel access procedure can be applicable with a limitation on the duration of the gap from the end of the previous transmission on the channel as a first predefined value (e.g., 16 us).

For yet another instance, if a transmitter of a PSFCH is aware of being in a channel occupancy, the transmitter can perform a Type 2A channel access procedure to access the channel (e.g., including a time duration spanned by sensing slots that are sensed to be idle before a SL transmission to be deterministic as 25 us). For further instance, the Type 2A channel access procedure can be applicable with a limitation on the duration of the gap from the end of the previous transmission on the channel as a second predefined value (e.g., 25 us).

In one embodiment, for a PSSCH transmission that enables HARQ feedback transmission, the time domain information for the associated PSFCH transmission occasion can be dynamically indicated to the UE.

Figure 14:
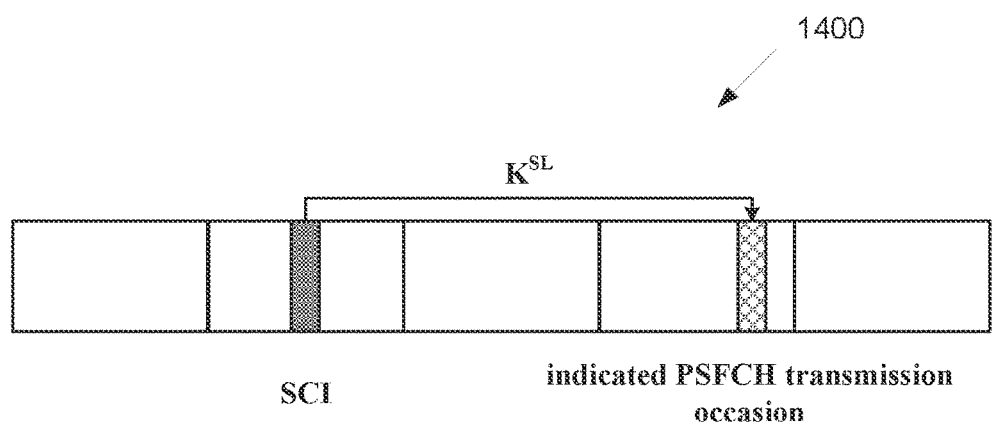
FIG. 14 illustrates an example of dynamic indication of time domain PSFCH TX occasion according to embodiments of the present disclosure.

FIG. 14 illustrates an example of dynamic indication of time domain PSFCH TX occasion 1400 according to embodiments of the present disclosure. The embodiment of the dynamic indication of time domain PSFCH TX occasion 1400 illustrated in FIG. 14 is for illustration only.

In one example, a time offset (e.g., denoted as $K^{SL}$) between the SCI and the PSFCH for transmitting the HARQ feedback can be indicated in a SCI format. An illustration of this example is shown in FIG. 14.

In one example, the time offset is in the unit of slots, and the UE assumes the difference between the slot including the SCI and the slot including the PSFCH for the HARQ feedback transmission is $K^{SL}$ slots.

In another example, the time offset is in the unit of symbols, and the UE assumes the difference between the last symbol including the SCI and the first symbol including the PSFCH for the HARQ feedback transmission is $K^{SL}$ slots.

In yet another example, the time offset is in the unit of period, and the UE assumes the difference between the period including the SCI and the period including the PSFCH for the HARQ feedback transmission is $K^{SL}$ periods, wherein the period is for the defining the mapping between a combination of time domain (e.g., a slot in the period) and frequency domain (e.g., a sub-channel) resource for PSSCH and a PSFCH resource in the period.

In yet another example, the time offset is in the number of time domain PSFCH transmission occasions, and the UE assumes the time domain PSFCH transmission occasion including the PSFCH for the HARQ feedback transmission is the $K^{SL}$ th time domain PSFCH transmission occasion after the reception of the SCI.

In one example, the set of values that $K^{SL}$ is indicated from can be fixed in the specification, e.g., $K^{SL} \in \{0, 1, \ldots, K_{max}^{SL}\}$ where $K_{max}^{SL}$ is the maximum value that $K^{SL}$ can take.

In another example, the set of values that $K^{SL}$ is indicated from can be pre-configured, e.g., the set of values can be pre-configured as the set or a subset of $\{0, 1, \ldots, K_{max}^{SL}\}$ where $K_{max}^{SL}$ is the maximum value that $K^{SL}$ can take.

In yet another example, the set of values that $K^{SL}$ is indicated from can be configured by a higher layer parameter, e.g., the set of values can be configured as the set or a subset of $\{0, 1, \ldots, K_{max}^{SL}\}$ where $K_{max}^{SL}$ is the maximum value that $K^{SL}$ can take.

In yet another example, the set of values that $K^{SL}$ is indicated from can be provided by a MAC CE, e.g., the set of values can be provided as the set or a subset of $\{0, 1, \ldots, K_{max}^{SL}\}$ where $K_{max}^{SL}$ is the maximum value that $K^{SL}$ can take.

In yet another example, in addition to the set of values from above examples, $K^{SL}$ can be indicated as a special state (e.g., either a non-numerical value or a negative integer) such that the UE assumes the time domain information of the PSFCH transmission occasion is not available based on the received SCI. If the UE is indicated with such a special state, the UE may assume that the time domain information of the PSFCH transmission occasion could be provided later (e.g., in a later SCI).

In one example, the SCI indicating the time domain information of the PSFCH transmission occasion can be the SCI associated with the PSSCH transmission that enables the HARQ feedback transmission. For one sub-instance, the SCI format can be a SCI Format 1-A that schedules the PSSCH. For another sub-instance, the SCI format can be a SCI Format 2-A that is used for decoding of the PSSCH. For yet another sub-instance, the SCI format can be a SCI Format 2-B that is used for decoding of the PSSCH. For yet another sub-instance, the SCI format can be a new SCI format associated with a PSSCH transmission.

In one example, the SCI indicating the time domain information of the PSFCH transmission occasion can be a SCI not associated with the PSSCH transmission that enables the HARQ feedback transmission. For one sub-instance, the SCI format can be a SCI Format 1-A that schedules a PSSCH. For another sub-instance, the SCI format can be a SCI Format 2-A that is used for decoding of a PSSCH. For yet another sub-instance, the SCI format can be a SCI Format 2-B that is used for decoding of a PSSCH. For yet another sub-instance, the SCI format can be a new SCI format associated with a PSSCH transmission. In one instance, a HARQ process number can be associated with the time domain information of the PSFCH transmission occasion and included in the SCI. In another instance, the UE assumes to report all HARQ feedback information corresponding to all the HARQ processes. In one instance, the source ID included in the SCI that indicates the time domain information of the PSFCH transmission occasion is the same as the source ID included in the SCI that schedules the associated PSSCH transmission.

In yet another example, the SCI indicating the time domain information of the PSFCH transmission occasion can be a SCI format that includes the channel occupancy information at least for operation with shared spectrum channel access. In one instance, a HARQ process number can be associated with the time domain information of the PSFCH transmission occasion and included in the SCI. In another instance, the UE assumes to report all HARQ feedback information corresponding to all the HARQ processes.

In one example, the UE assumes the indicated the time domain information of the PSFCH transmission occasion satisfies the minimum time domain gap duration between the PSSCH and its associated PSFCH.

In another example, an indicator of reporting HARQ feedback in a PSFCH transmission occasion can be included in a SCI format, and the UE can determine the PSFCH transmission occasion without explicitly indication.

In one sub-example, the UE can determine the PSFCH transmission occasion to be in the same slot as the slot including the SCI.

In another sub-example, the UE can determine the PSFCH transmission occasion to be in the next slot comparing to the slot including the SCI.

In yet another sub-example, the UE can determine the PSFCH transmission occasion to be in the same period as the period including the SCI.

In yet another sub-example, the UE can determine the PSFCH transmission occasion to be in the next period comparing to the period including the SCI.

In yet another sub-example, the UE can determine the PSFCH transmission occasion to be the next associated PSFCH transmission occasion after the reception of the SCI and satisfying the minimum gap duration between the PSSCH and PSFCH.

In yet another sub-example, the UE can determine the PSFCH transmission occasion to be in the next slot that satisfies the minimum gap duration between the PSSCH and PSFCH.

In yet another sub-example, the UE can determine the PSFCH transmission occasion to be in the next period that satisfies the minimum gap duration between the PSSCH and PSFCH.

In one example, the SCI including the indicator of reporting HARQ feedback in a PSFCH transmission occasion can be the SCI associated with the PSSCH transmission that enables the HARQ feedback transmission. For one sub-instance, the SCI format can be a SCI Format 1-A that schedules the PSSCH. For another sub-instance, the SCI format can be a SCI Format 2-A that is used for decoding of the PSSCH. For yet another sub-instance, the SCI format can be a SCI Format 2-B that is used for decoding of the PSSCH. For yet another sub-instance, the SCI format can be a new SCI format associated with a PSSCH transmission.

In one example, the SCI including the indicator of reporting HARQ feedback in a PSFCH transmission occasion can be a SCI not associated with the PSSCH transmission that enables the HARQ feedback transmission. For one sub-instance, the SCI format can be a SCI Format 1-A that schedules a PSSCH. For another sub-instance, the SCI format can be a SCI Format 2-A that is used for decoding of a PSSCH. For yet another sub-instance, the SCI format can be a SCI Format 2-B that is used for decoding of a PSSCH. For yet another sub-instance, the SCI format can be a new SCI format associated with a PSSCH transmission. In one instance, a HARQ process number can be associated with the time domain information of the PSFCH transmission occasion and included in the SCI. In another instance, the UE assumes to report all HARQ feedback information corresponding to all the HARQ processes. In one instance, the source ID included in the SCI that indicates the time domain information of the PSFCH transmission occasion is the same as the source ID included in the SCI that schedules the associated PSSCH transmission.

In yet another example, the SCI including the indicator of reporting HARQ feedback in a PSFCH transmission occasion can be a SCI format that includes the channel occupancy information at least for operation with shared spectrum channel access. In one instance, a HARQ process number can be associated with the time domain information of the PSFCH transmission occasion and included in the SCI. In another instance, the UE assumes to report all HARQ feedback information corresponding to all the HARQ processes.

Figure 15:
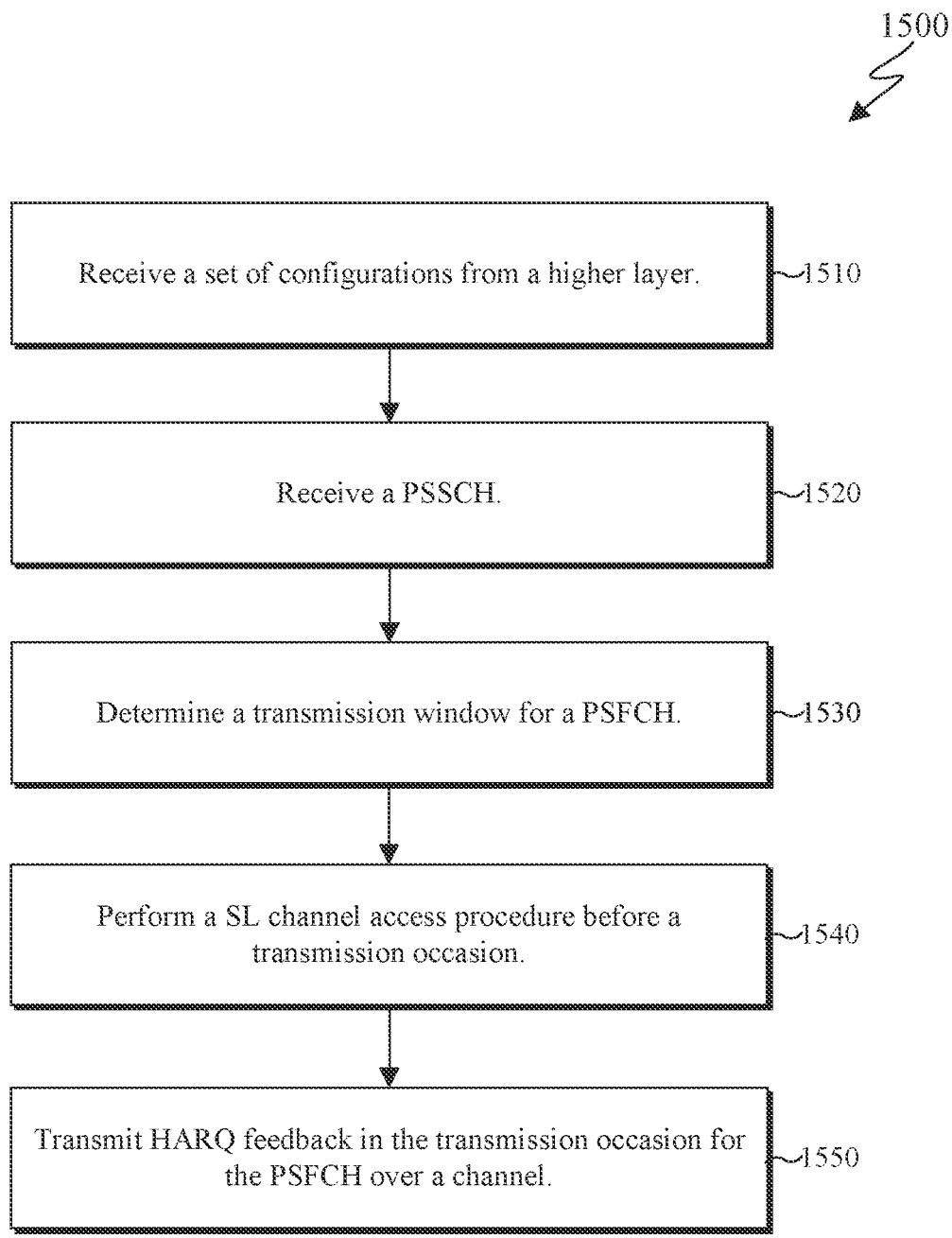
FIG. 15 illustrates a flowchart for an example method for determining a transmission window for a PSFCH according to embodiments of the present disclosure.

FIG. 15 illustrates a flowchart for an example method 1500 for determining a transmission window for a PSFCH according to embodiments of the present disclosure. The steps of the method 1500 of FIG. 15 can be performed by any of the UEs 111-116 of FIG. 1, such as the UE 116 of FIG. 3. The method 1500 is for illustration only and other embodiments can be used without departing from the scope of the present disclosure.

The method begins with the UE receiving a set of configurations from a higher layer (step 1510). The UE then receives a PSSCH (step 1520). For example, in step 1520, the PSSCH enables HARQ feedback.

The UE then determines a transmission window for a PSFCH (step 1530). For example, in step 1530, the PSFCH is to transmit the HARQ feedback and is determined from the set of configurations. In various embodiments, the transmission window includes one or multiple transmission occasions for the PSFCH and the one or multiple transmission occasions are based on at least one of a window offset, an interval between two neighboring transmission occasions, and a number of transmission occasions in the transmission window. In some examples, the window offset is determined based on a slot where the PSSCH is received. In some examples, the interval is determined as one or multiple periods and a value of a period among the one or multiple periods is provided by the higher layer. In various embodiments, the UE receives a SCI format and determines an index of the transmission occasion for the PSFCH within the one or multiple transmission occasions based on the SCI format.

The UE then performs a SL channel access procedure before a transmission occasion in the one or multiple transmission occasions (step 1540). For example, in step 1540, the UE determines whether the transmission occasion for the PSFCH is within a channel occupancy and determining a type of the SL channel access procedure upon determining that the transmission occasion for the PSFCH is within the channel occupancy. In various embodiments, determining the type of the SL channel access procedure includes determining, based on a gap from an end of a previous transmission, the type of the SL channel access procedure. For example, the SL channel access procedure is Type 2C, when the gap is no larger than a first predefined value, and the Type 2C SL channel access procedure includes a time duration spanned by sensing slots that are sensed to be idle before a SL transmission to be deterministic as 0; the SL channel access procedure is Type 2B, when the gap is equal to the first predefined value, and the Type 2B SL channel access procedure includes a time duration spanned by sensing slots that are sensed to be idle before a SL transmission is deterministic as the first predefined value; and the SL channel access procedure is Type 2A, when the gap is equal to a second predefined value, and the Type 2A SL channel access procedure includes a time duration spanned by sensing slots that are sensed to be idle before a SL transmission is deterministic as the second predefined value. In one example, the first predefined value is 25 microseconds, and the second predefined value is 16 microseconds. In various embodiments, performing the SL channel access procedure includes performing the SL channel access procedure before the transmission occasion with the determined index.

The UE then transmits the HARQ feedback in the transmission occasion for the PSFCH over a channel upon successfully performing the SL channel access procedure (step 1550). For example, in step 1550, the determines a first sequence of the HARQ feedback using a first cyclic shift for a first transmission occasion for the PSFCH within the one or multiple transmission occasions and determines a second sequence of the HARQ feedback using a second cyclic shift for a second transmission occasion for the PSFCH within the one or multiple transmission occasions, where the first cyclic shift is different from the second cyclic shift. In some embodiments, the first cyclic shift is based on an index of the first transmission occasion for the PSFCH within the one or multiple transmission occasions and the second cyclic shift is based on an index of the second transmission occasion for the PSFCH within the one or multiple transmission occasions. In various embodiments, transmitting the HARQ feedback includes transmitting the HARQ feedback in the transmission occasion over the channel upon successfully performing the SL channel access procedure.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system operating with a shared spectrum channel access, the UE comprising:
   a transceiver configured to:
      receive a set of higher layer parameters, and
      receive a physical sidelink shared channel (PSSCH); and
   a processor operably coupled to the transceiver, the processor configured to:
      determine, from the set of higher layer parameters, a period for transmission occasions of a physical sidelink feedback channel (PSFCH) and a number of transmission occasions of the PSFCH,
      determine transmission occasions for the PSFCH associated with the PSSCH based on the period and the number, and
      perform a sidelink (SL) channel access procedure before a transmission occasion in the transmission occasions,
   wherein the transceiver is further configured to transmit the PSFCH in the transmission occasion over a channel upon successfully performing the SL channel access procedure.

2. The UE of claim 1, wherein the transmission occasions periodically occur with an interval of the period.

3. The UE of claim 1, wherein a first transmission occasion within the transmission occasions is with at least a time gap from the PSSCH.

4. The UE of claim 1, wherein the processor is further configured to:
   determine a first set of physical resource blocks (PRBs) for a first transmission occasion within the transmission occasions; and
   determine a second set of PRBs for a second transmission occasion within the transmission occasions,
   wherein the first set of PRBs and the second set of PRBs do not overlap.

5. The UE of claim 1, wherein the processor is further configured to:
   determine whether the transmission occasion for the PSFCH is within a channel occupancy; and
   determine a type of the SL channel access procedure upon determining that the transmission occasion for the PSFCH is within the channel occupancy.

6. The UE of claim 5, wherein:
   the processor is further configured to determine, based on a gap from an end of a previous transmission, the type of the SL channel access procedure;
   the type of the SL channel access procedure is Type 2C, when the gap is no larger than a first predefined value, and the Type 2C SL channel access procedure includes a time duration spanned by sensing slots that are sensed to be idle before a SL transmission to be deterministic as 0;
   the type of the SL channel access procedure is Type 2B, when the gap is equal to the first predefined value, and the Type 2B SL channel access procedure includes a time duration spanned by sensing slots that are sensed to be idle before a SL transmission is deterministic as the first predefined value; and
   the type of the SL channel access procedure is Type 2A, when the gap is equal to a second predefined value, and the Type 2A SL channel access procedure includes a time duration spanned by sensing slots that are sensed to be idle before a SL transmission is deterministic as the second predefined value.

7. The UE of claim 6, wherein the first predefined value is 25 microseconds and the second predefined value is 16 microseconds.

8. A method of a user equipment (UE) in a wireless communication system operating with a shared spectrum channel access, the method comprising:
   receiving a set of higher layer parameters;
   receiving a physical sidelink shared channel (PSSCH);
   determining, from the set of higher layer parameters, a period for transmission occasions of a physical sidelink feedback channel (PSFCH) and a number of transmission occasions of the PSFCH;
   determining transmission occasions for the PSFCH associated with the PSSCH based on the period and the number;
   performing a sidelink (SL) channel access procedure before a transmission occasion in the transmission occasions; and
   transmitting the PSFCH in the transmission occasion upon successfully performing the SL channel access procedure.

9. The method of claim 8, wherein the transmission occasions periodically occur with an interval of the period.

10. The method of claim 8, wherein a first transmission occasion within the transmission occasions is with at least a time gap from the PSSCH.

11. The method of claim 8, further comprising:
    determining a first set of physical resource blocks (PRBs) for a first transmission occasion within the transmission occasions; and
    determining a second set of PRBs for a second transmission occasion within the transmission occasions,
    wherein the first set of PRBs and the second set of PRBs do not overlap.

12. The method of claim 8, further comprising:
    determining whether the transmission occasion for the PSFCH is within a channel occupancy; and
    determining a type of the SL channel access procedure upon determining that the transmission occasion for the PSFCH is within the channel occupancy.

13. The method of claim 12, further comprising:
    determining, based on a gap from an end of a previous transmission, the type of the SL channel access procedure;

the type of the SL channel access procedure is Type 2C, when the gap is no larger than a first predefined value, and the Type 2C SL channel access procedure includes a time duration spanned by sensing slots that are sensed to be idle before a SL transmission to be deterministic as 0;

the type of the SL channel access procedure is Type 2B, when the gap is equal to the first predefined value, and the Type 2B SL channel access procedure includes a time duration spanned by sensing slots that are sensed to be idle before a SL transmission is deterministic as the first predefined value; and the type of the SL channel access procedure is Type 2A, when the gap is equal to a second predefined value, and the Type 2A SL channel access procedure includes a time duration spanned by sensing slots that are sensed to be idle before a SL transmission is deterministic as the second predefined value.

14. The method of claim 13, wherein the first predefined value is 25 microseconds and the second predefined value is 16 microseconds.

* * * * *